United States Patent
Kondo et al.

(10) Patent No.: US 7,072,075 B2
(45) Date of Patent: Jul. 4, 2006

(54) IMAGE READER

(75) Inventors: Shin Kondo, Kanagawa (JP); Kosuke Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 529 days.

(21) Appl. No.: 10/377,662

(22) Filed: Mar. 4, 2003

(65) Prior Publication Data

US 2004/0057616 A1 Mar. 25, 2004

(30) Foreign Application Priority Data

Sep. 20, 2002 (JP) .................................... P2002-274870

(51) Int. Cl.
*H04N 1/58* (2006.01)

(52) U.S. Cl. ........................ 358/1.9; 358/3.26; 358/530; 358/463

(58) Field of Classification Search .................. 358/1.9, 358/3.26, 504, 505, 530, 406, 463, 443, 496; 382/275, 318, 319

See application file for complete search history.

(56) References Cited

U.S. PATENT DOCUMENTS 5,959,290 A * 9/1999 Schweid et al. ............ 382/275

6,295,140 B1 * 9/2001 Kameyama ................. 358/461
2003/0174221 A1 * 9/2003 Tsuda ......................... 348/241

FOREIGN PATENT DOCUMENTS

| JP | 9-139844 | 5/1997 |
| JP | 2000-152008 | 5/2000 |
| JP | 2002-158835 | 5/2002 |
| JP | 2002-271631 | 9/2002 |
| JP | 2002271631 A * | 9/2002 |

* cited by examiner

*Primary Examiner*—Scott Rogers
(74) *Attorney, Agent, or Firm*—Morgan, Lewis & Bockius LLP

(57) ABSTRACT

An image reader reads an image on a sheet document while feeding the sheet document by an automatic document feeder (ADF). A CCD sensor includes first pixel rows and a second pixel row. The first pixel rows read R, G, B color components of a document image while scanning the document in a main scanning direction. The second pixel row is disposed at a predetermined distance in a sub-scanning direction from the first pixel rows. The second pixel row reads one color component of the document image. The image reader uses the CCD sensor to detect noise component on image data read by the first pixel rows or the second pixel row based on each of image data read by the first and second pixel rows and to eliminate the detected noise component.

17 Claims, 21 Drawing Sheets

RGB READ IMAGE DATA

GREEN 2 READ IMAGE DATA

RGB READ IMAGE DATA (AFTER ELIMINATING STRIPE)

GREEN READ IMAGE DATA

GREEN 2 READ IMAGE DATA

GREEN 2 READ IMAGE DATA (AFTER ELIMINATING STRIPE)

FIG. 15 (A)

| CONVEX PIXEL SIGNAL R | CONVEX PIXEL SIGNAL G | CONVEX PIXEL SIGNAL B | COMPARISON SIGNAL A | LOGIC SIGNAL R |
|---|---|---|---|---|
| 1 | 0 | 0 | 0 | 1 |
| OTHER | | | | 0 |

LOGICAL TABLE R

FIG. 15 (B)

| CONVEX PIXEL SIGNAL R | CONVEX PIXEL SIGNAL G | CONVEX PIXEL SIGNAL B | COMPARISON SIGNAL A | LOGIC SIGNAL G |
|---|---|---|---|---|
| × | 1 | × | 1 | 1 |
| OTHER | | | | |

LOGICAL TABLE G

FIG. 15 (C)

| CONVEX PIXEL SIGNAL R | CONVEX PIXEL SIGNAL G | CONVEX PIXEL SIGNAL B | COMPARISON SIGNAL A | LOGIC SIGNAL B |
|---|---|---|---|---|
| 0 | 0 | 1 | 0 | 1 |
| OTHER | | | | 0 |

LOGICAL TABLE B

CALCULATE ABSOLUTE VALUE OF DIFFERENCE FROM FOCUSED PIXEL ($|D_{xy}-D_{37}|$)

FIG. 24

| STRIPE DETECTION SIGNAL R | STRIPE DETECTION SIGNAL G | STRIPE DETECTION SIGNAL B | RED OUTPUT DATA | GREEN OUTPUT DATA | BLUE OUTPUT DATA |
|---|---|---|---|---|---|
| × | 1 | × | RED REPLACED DATA | GREEN REPLACED DATA | BLUE REPLACED DATA |
| 1 | 0 | 0 | RED REPLACED DATA | GREEN INPUT DATA | BLUE INPUT DATA |
| 0 | 0 | 1 | RED INPUT DATA | GREEN INPUT DATA | BLUE REPLACED DATA |
| OTHER | | | RED INPUT DATA | GREEN INPUT DATA | BLUE INPUT DATA |

US 7,072,075 B2

IMAGE READER

The present disclosure relates to the subject matter contained in Japanese Patent Application No. 2002-274870 filed on Sep. 20, 2002, which is incorporated herein by reference in its entirety.

BACKGROUND OF THE INVENTION

1. Field of the Invention

The invention relates to an image reader such as a copying machine, a facsimile, and a scanner, which reads images formed on a document that is an object to be read, more specifically, an image reader, which reads images on a sheet document while moving the document by an automatic document feeder.

2. Description of the Related Art

As image readers, a type which reads images on a document while moving a reading optical system upon placing the document on a platen glass, and a type which reads images on a document while moving the sheet document by an automatic document feeder upon fixing a reading optical system to a document reading position are generally known. Comparing these systems, the latter image reader, which moves a sheet document, is more advantageous than the former one, which moves the reading optical system, in terms of improvement in document image reading speed.

However, in the case of the latter image reader, if dust adhering to a document contaminates a contact glass at the document reading position or adheres to the contact glass, such contamination or dust is always read since the reading optical system is fixed at the document reading position. This causes a stripe noise in the image reading results.

In order to eliminate such a problem particular to an image reader using a document automatic feeding system, various techniques have been conventionally proposed. For example, a technique (for example, JP-A-9-139844) exists in which a plurality of photoelectric transducers are arranged in a document feeding direction, the reading results by the photoelectric transducers with respect to the same position on a document are compared, and when a difference exists between the reading results, the difference is detected as a noise component, and the noise component is eliminated. Also, a technique (JP-A-2000-152008) exists in which when a noise component is detected, the noise component is eliminated by using the reading result of one of the photoelectric transducers.

However, both the abovementioned techniques according to the related art corresponds to monochrome image reading. If the techniques are applied to color image reading, it is necessary to construct an image reader so that at least two sets of three photoelectric transducers having spectral sensitivity characteristics of red (R), green (G), and blue (B). That is, it is necessary to provide a total of six photoelectric transducers or more in the document feeding direction. Therefore, power consumption by the photoelectric transducers increases, and the heat release value from these elements also increases.

Also, it is necessary that in accordance with the number of photoelectric transducers, it is necessary to provide at least six image processing circuits, which apply analog processing and shading correction to output signals from the photoelectric transducers. Therefore, the circuit scale and power consumption increase, resulting in a remarkable increase in cost.

SUMMARY OF THE INVENTION

Therefore, an object of the invention is to provide an image reader, which can eliminate influence from foreign matter such as dust on color image reading results without increasing the circuit scale, power consumption, and heat release value from the photoelectric transducers even in a case of reading color images by the document automatic feeding system.

An image reader according to an aspect of the invention includes a feeding unit, a first reading unit, a second reading unit, and a noise detecting unit. The feeding unit feeds a document to a reading position. The first reading unit reads a plurality of color components of a document image while scanning the document fed to the reading position by the feeding unit in a main scanning direction corresponding to a direction perpendicular to the feeding direction of this document. The second reading unit is disposed at a predetermined distance from the first reading unit in a sub-scanning direction corresponding to the document feeding direction. The second reading unit reads one of the plurality of color components of the document image while scanning the document fed to the reading position by the feeding unit in the main scanning direction. The noise detecting unit detects a noise component on image data read by one of the first reading unit and the second reading unit based on the plurality of pieces of image data read by the first reading unit and the second reading unit.

In the image reader constructed as mentioned above, the document that is an object to be read is fed to a reading position by the feeding unit. At this reading position, the first reading unit reads a plurality of color components of an image while scanning the document in the main scanning direction. On the other hand, the second reading unit reads any one color component of the plurality of colors of the image. The noise detecting unit detects a noise component on image data read by the first reading unit or the second reading unit based on a plurality of image data pieces obtained through image reading by these reading unit. Furthermore, the noise eliminating unit eliminates the noise component from image data read by the first reading unit or the second reading unit based on the detection results of the noise eliminating unit.

BRIEF DESCRIPTION OF THE DRAWINGS

FIG. 15 is a diagram showing a logical table of the logical circuit.

FIG. 24 is a diagram showing a logical table of the second selecting circuit.

DETAILED DESCRIPTION OF THE PREFERRED EMBODIMENTS

Hereinafter, an embodiment of the invention will be described in detail with reference to the accompanying drawings.

Figure 1:
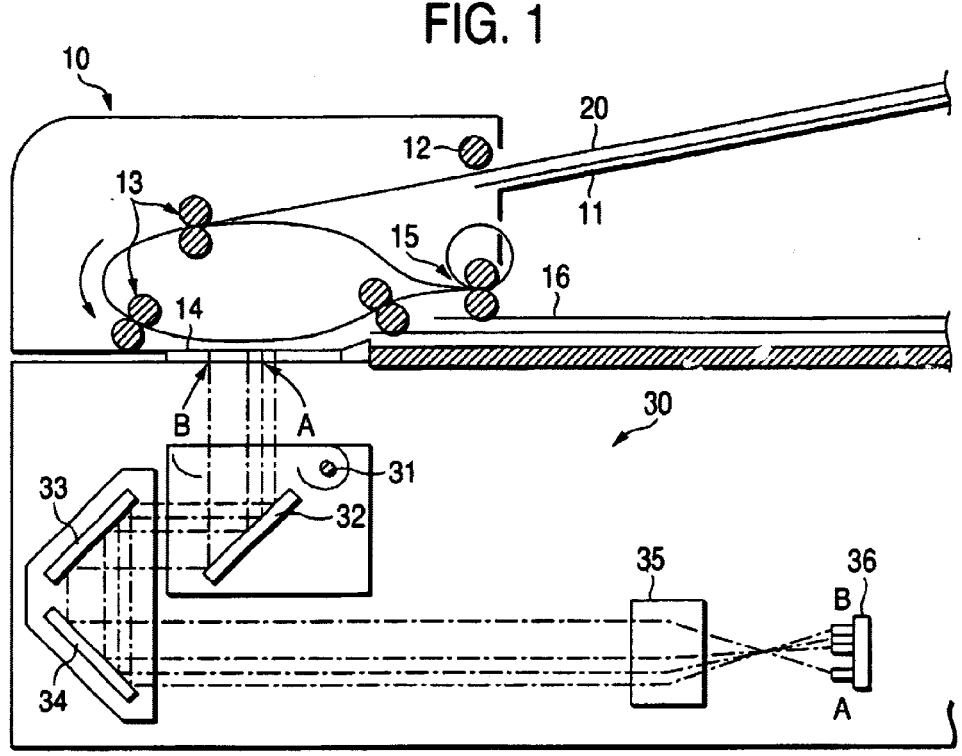
FIG. 1 is a side sectional view showing the outline construction of the main portion of the image reader relating to an embodiment of the invention.

FIG. 1 is a side sectional view showing the general construction of the main portion of an image reader according to an embodiment of the invention. The image reader of the present embodiment has an automatic document feeder (hereinafter, abbreviated to "ADF") 10. The image reader covers a so-called CVT (Constant Velocity Transfer) mode in which while feeding a sheet document (hereinafter, referred to as "document") 20 that is an object to be read by the ADF 10, an image is read from the document 20.

Namely, in the CVT mode, the document 20 placed on a document placing platform 11 of the ADF 10 is fed sheet by sheet to a feed roller 13 by a lead-in roller 12. After the feed roller 13 changes the feeding direction, the document is guided to a contact glass 14. Then, the document 20 is fed on the contact glass 14 with being parallel to this contact glass. At this point, reading of an image on the document 20 is carried out in a manner described later. Thereafter, the document 20, which has been read, is ejected by a feed roller 15 onto an eject tray 16 of the ADF 10.

On the contact glass 14, an exposure lamp 31 irradiates the document 20 being fed on the contact glass 14. A first mirror 31, a second mirror 33 and a third mirror 34 change an optical path of reflected light by this irradiation. Then, a lens 35 reduces and focuses the reflected light on an image pickup surface of a photoelectric transducer, for example, a CCD (Charge Coupled Device) type line sensor (hereinafter, referred to as "CCD sensor") 36.

These exposure lamp 31, first mirror 32, second mirror 33, third mirror 34, lens 35, and CCD sensor 36 construct a reading optical system 30 for reading an image on the document 20. Thereby, an image formed on the document 20 fed on the contact glass 14 is read in pixel units by the CCD sensor 36 and output as analog image signals by photoelectrically conversion.

Figure 2:
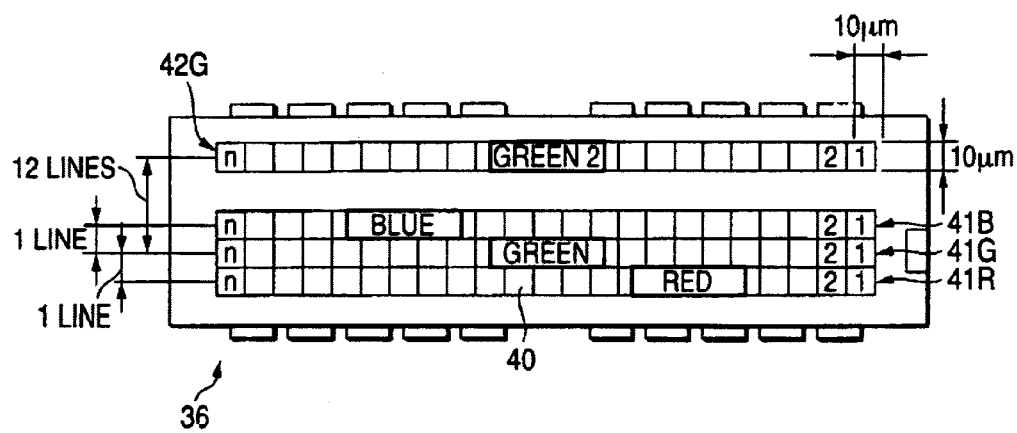
FIG. 2 is a construction view showing an example of the CCD sensor to be used in the image reader relating to the embodiment.

FIG. 2 is a constructional view showing an example of the outline of the CCD sensor 36 used in the image reader according to the present invention.

As apparentaly shown in FIG. 2, the CCD sensor 36 includes a plurality of photoelectric transducer rows (pixel rows) each formed of light receiving cells (pixels) 40 such as photodiodes linearly arranged. Concretely, the CCD sensor includes three pixel rows 41R, 41G, and 41B and one pixel row 42G. The three pixel rows 41R, 41G, and 41B have the spectral sensitivity characteristics of red (hereinafter, referred to as "R"), green (hereinafter, referred to as "G"), and blue (hereinafter, referred to as "B"), respectively and are juxtaposed. The one pixel row 42G is disposed at a predetermined distance from the pixel rows 41R, 41G, and 41B in a direction perpendicular to the pixel arrangement direction (main scanning direction), that is, the document feeding direction (sub-scanning direction) and has the spectral sensitivity characteristic of, for example, green.

In each of the pixel rows 41R, 41G, and 41B, n of light receiving cells 40 formed of, for example, 10 μm×10 μm photodiodes, etc., are linearly arranged, and are arranged in three rows at intervals (pitches) of one line (10 μm) in order of R, G, and B from the lower side of the figure.

As with the pixel rows 41R, 41G, and 41B, the pixel row 42G includes n of light receiving cells 40 formed of, for example, 10 μm×10 μm photodiodes, etc., linearly arranged, and correspond to the spectral sensitivity characteristic of G equivalent to that of the pixel row arranged at a center of the three pixel rows 41R, 41G, and 41B, that is, the pixel row 41G. Furthermore, the separated one pixel row 42G is arranged offset in the document feeding direction (sub-scanning direction) from the pixel rows 41R, 41G, and 41B so that a distance between the separated one pixel row 42G and the pixel row 41G is, for example, 12 lines (120 μm).

The lens 35 reduces and focuses the reading light of the document image on the image pickup surface o the CCD sensor 36. Therefore, when the reading resolution is 600 dpi, the distance of one line (10 μm) and the distance of 12 lines (120 μm) in the CCD sensor 36 correspond to 60 μm and 720 μm at the reading position on the document feeding path, respectively.

Thereby, the respective pixel rows 41R, 41G, 41B, and 42G simultaneously read images of 4 lines at separated positions in the sub-scanning direction on the document and output the read image as analog image signals. Namely, from the three pixel rows 41R, 41G, and 41B, analog image signals indicating the densities of R, G, and B of the respective pixels of the images, which are separated by one line from each other are output. Also, from the separated one pixel row 42G, analog image signals indicating the densities of G of the respective pixels of the image separated by 12 lines from the pixel row 41G positioned at the center of the three pixel rows.

Figure 3:
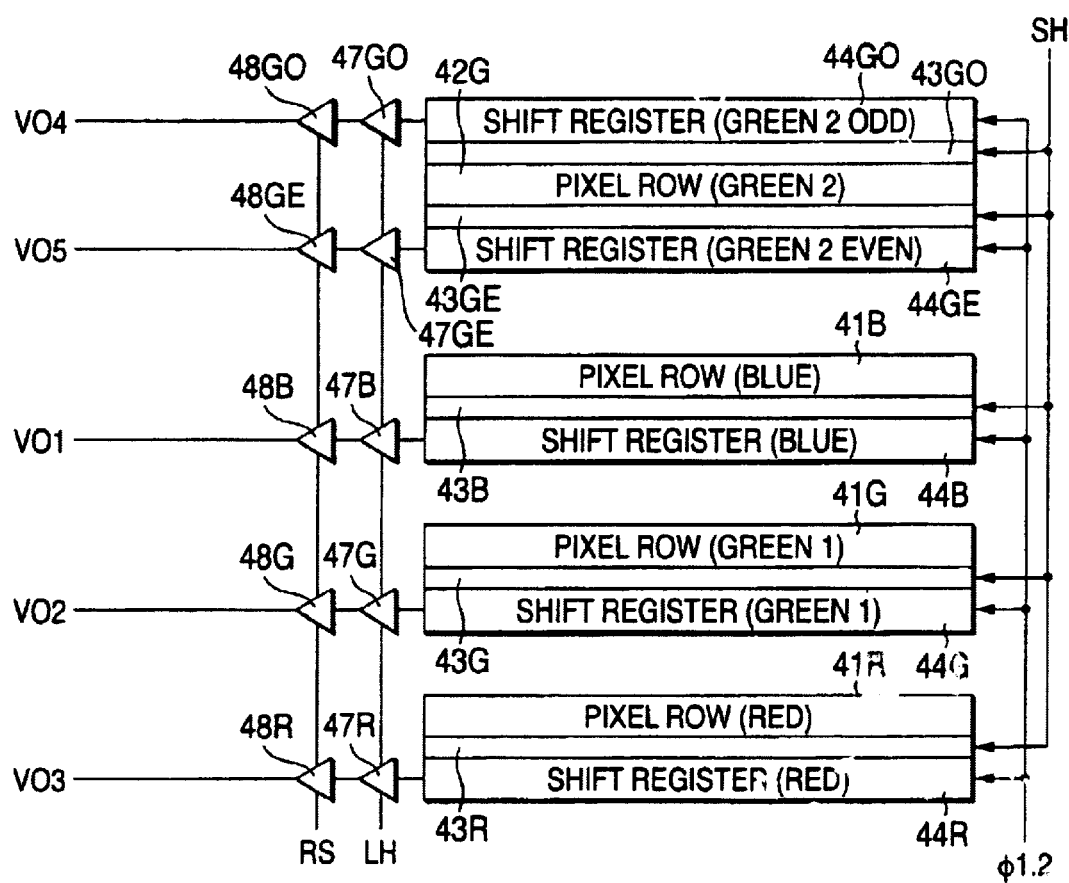
FIG. 3 is a block diagram showing the functional construction of the CCD sensor.

FIG. 3 is a block diagram showing the functional construction of the CCD sensor 36. As apparently shown in FIG. 3, a shift gate 43B is disposed at one side of the pixel row 41B along the pixel arrangement direction, and a shift register 44B is disposed at the outer side of the shift gate 43B along the pixel arrangement direction. Likewise, with regard to the pixel rows 41G and 41R, shift gates 43G and 43R are disposed at one side of each pixel row along the pixel arrangement direction, and at the outer sides of these, shift registers 44G and 44R are disposed along the pixel arrangement direction, respectively.

The shift gates 43B, 43G, and 43R conduct photoelectric conversion at the respective pixels (light receiving cells) of the pixel rows 41B, 41G, and 41R when providing a shift pulse SH, and move accumulated charges to the shift registers 44B, 44G, and 44R at a time. The shift registers 44B, 44G, and 44R are driven by transfer pulses $\phi 1$ and $\phi 2$ having phases, which are reverse to each other, to successively transfer the charges shifted from the pixel rows 41B, 41G, and 41R.

The transferred charges are transferred to output portions 48B, 48G, and 48R having, for example, floating diffusions when a last transfer pulse LH is applied to last transfer gates 47B, 47G, and 47R, and are converted into electrical signals here and led out as output signals VO1, VO2, and VO3. The output portions 48B, 48G, and 48R reset the charges after leading-out the output signals VO1, VO2, and VO3 in response to application of a reset pulse RS.

On the other hand, with regard to the pixel row 42G, shift gates 43GO and 43GE are disposed at both sides of the pixel row along the pixel arrangement direction, and at the outer side of the shift gates, shift registers 44GO and 44GE are disposed along the pixel arrangement direction. A charge reading-out (outputting) operation of the pixel row 42G is basically the same as that of the pixel rows 41B, 41G, and 41R. However, the operation is different in the following points.

That is, in the shift registers 44GO and 44GE, number of shifting steps (transfer steps) is ½ of that of the shift registers 44B, 44G, and 44R. Furthermore, shift gates 43GO and 43GE A divides and transfers charges of the odd pixels and even pixels to the shift registers 44GO and 44GE. The shift registers 44GO and 44GE transfer charges of two systems of odd and even in parallel in response to two-phase transfer pulses $\phi 1$ and $\phi 2$. The charges of the two systems, which have been transferred in parallel, are transferred to the output portions 48GO and 48GE in response to application of the last transfer pulse LH to the last transfer gates 47GO and 47GE, converted into electrical signals here, and then led-out as output signals VO4 and VO5.

Thus, with regard to the separated one pixel row 42G corresponding to the color component of G, two shift registers 44GO and 44GE are disposed at both sides and charges of the odd pixels and the even pixels are divided and transferred in parallel. Thereby, the separated one pixel row can conduct reading at a speed of two times as fast as the other three pixel rows 41B, 41G, and 41R. As a result, when reading by using this pixel row 42G, high-speed reading is possible. For example, a reading mode using the three pixel rows 41B, 41G, and 41R is used as a color reading mode and a reading mode using the pixel row 42G is used as a monochrome reading mode, reading in the monochrome reading mode can achieve at a reading speed of two times as fast as the color reading mode.

Figure 4:
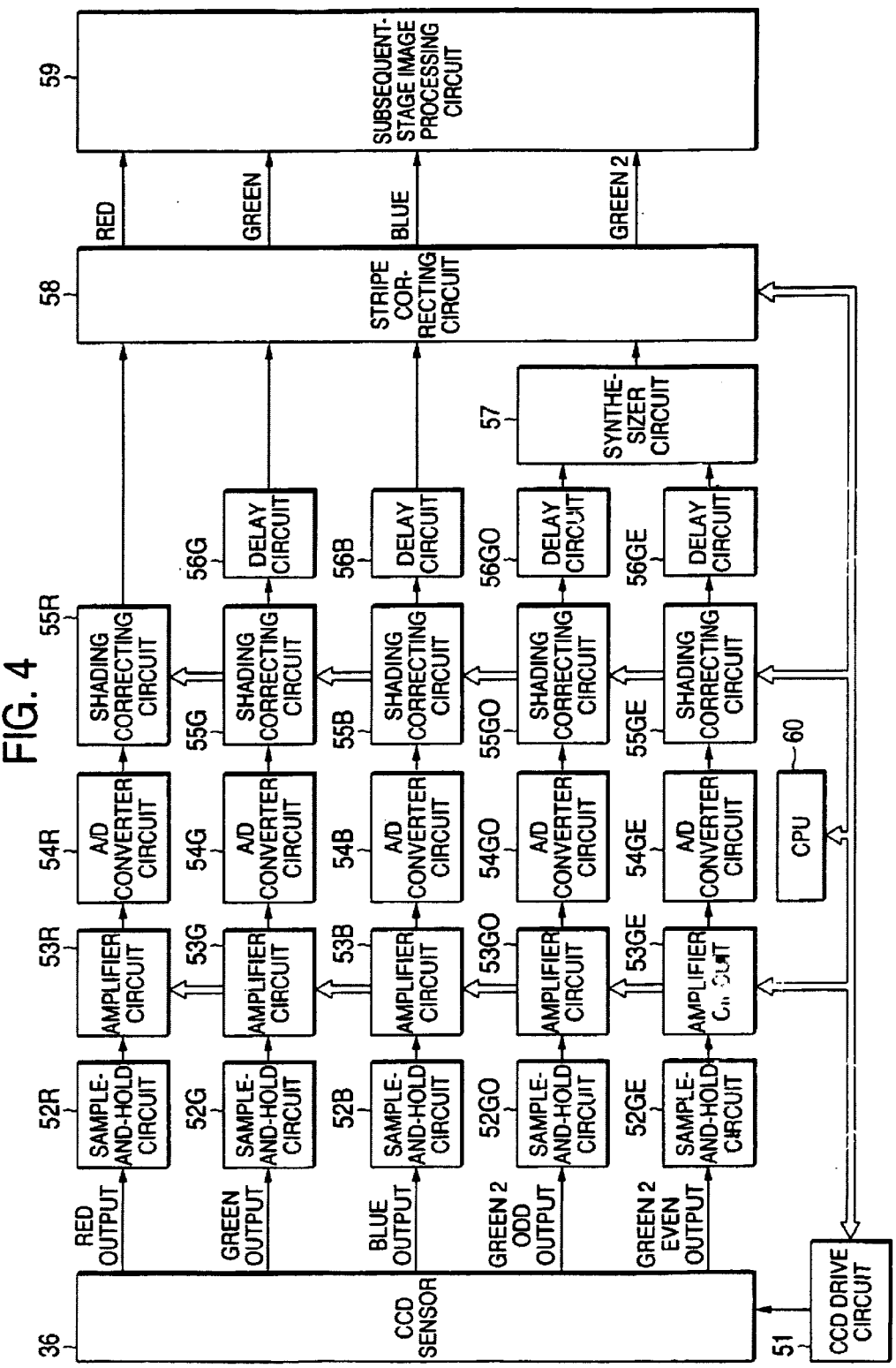
FIG. 4 is a block diagram showing an example of the construction of the signal processing system in the image reader relating to the embodiment.

FIG. 4 is a block diagram showing an example of the construction of a signal processing system in a case where the CCD sensor 36 having the abovementioned construction is used in the image reader according to the present embodiment.

In FIG. 4, the CCD sensor 36 outputs the analog image signals of R, G, and B and the analog image signals of the odd pixels and the even pixels regarding G when being driven by the CCD drive circuit 51. The CCD drive circuit 51 generates various timing signals and clock signals, more specifically, the shift pulse SH, the transfer pulses $\phi 1$ and $\phi 2$, the last transfer pulse LH and the reset pulse RS. The CCD sensor 36 is driven by these signals.

The analog image signals output from the CCD sensor 36 are sampled and held by sample-and-hold circuits 52R, 52G, 52B, 52GO, and 52GE, amplified by amplifier circuits 53R, 53G, 53B, 53GO, and 53GE, and then converted into digital image data by A/D converter circuits 54R, 54G, 54B, 54GO, and 54GE. Thereafter, the digital image data is subjected to correction in accordance with the sensitivity fluctuation of the CCD sensor 36 and light distribution characteristics of the reading optical system 30 (see FIG. 1) by shading correcting circuits 55R, 55G, 55B, 55GO, and 55GE. Then, the corrected digital image data are input into delay circuits 56G, 56B, 56GO, and 56GE except for image data of R.

In the delay circuits 56G, 56B, 56GO, and 56GE, three image data except for the R output are delayed to match (synchronize) all the image data in terms of time based on the reading position of the R output. Namely, delays by the delay circuits 56G and 56B are set to times corresponding to one line and two lines, respectively, and delays by the delay circuits 56GO and 56GE are set to times corresponding to 13 lines, respectively. Thereby, image data of B and G and image data of the two systems of G can be synchronized with the image data of R.

The synchronized image data is input into a stripe correcting circuit 58. It is noted that the image data of the two systems of G, that is, the image data of the odd pixels and the image data of the even pixels are synthesized by a synthesizer circuit 57 so as to match with the pixel arrangement order of the original pixel row 42G (see FIG. 3), and thereafter are input into the stripe correcting circuit 58. The stripe correcting circuit 58 carries out processing of detection and elimination of stripes of the input image data and transfers the processed data to an image processing circuit 59 at a subsequent stage.

The image processing circuit 59 of the subsequent stage applies image processing such as color space conversion, enlarging and reduction, background removal, and binarization to the image data to which the stripe correction processing has been applied. A CPU 60 is a unit for controlling the respective parts of this image reader. Concretely, the CPU 60 carries out setting of a drive cycle of the CCD sensor 36 by the CCD drive circuit 51, gain control of the amplifier circuits 53R, 53G, 53B, 53GO, and 53GE, control of the shading correcting circuits 55R, 55G, 55B, 55GO, and 55GE, and constant control of the stripe correcting circuit 58.

Herein, in the stripe correcting circuit 58, which is a characteristic portion of the embodiment of the invention, the principle of detection of stripes in the sub-scanning direction on an image due to adhesion of dust to the contact glass is described.

First, on the contact glass 14 shown in FIG. 1, assuming that dust adheres to a position A in the optical paths of the three pixel rows 41R, 41G, and 41B, the dust at this position is read as an image by the pixel rows 41R, 41G, and 41B. In this case, vertical stripes extending in the sub-scanning direction, which the document does not contain, appear in the read images of the three pixel rows 41R, 41G, and 41B due to the dust. On the other hand, no dust exists at a position B in the optical path of the pixel row 42G, which is separated by 12 lines from this so that the image on the document at this point is normally read by the pixel row 42G.

A reading result of the pixel row 42G, which is precedently read, is delayed by time required for feeding a paper between the reading positions, which is separated by 12 lines from each other. Then, the delayed reading result is compared with a reading result of the center pixel row of the pixel rows 41R, 41G, 41B, which is equal to the pixel row 42G in spectral sensitivity characteristic, that is, a reading result of the pixel row 41G. As a result, both reading results show difference at the position where the dust exists.

Therefore, when the reading result of the pixel row 41G is compared with the reading result of the pixel row 42G, vertical stripes due to adhesion of dust and floating dust on the optical path of the pixel rows 41R, 41G, 41B can be detected. Furthermore, similarly, when dust adheres to the position B on the optical path of the pixel row 42G and no dust exists at the position A on the optical path of the pixel rows 41R, 41G, 41B, vertical stripes due to adhesion of dust and floating dust on the optical path of the pixel row 42G can be detected by comparing the reading result of the pixel row 41G and the reading result of the pixel row 42G.

Furthermore, in the present embodiment, the distance between the central pixel row 41G and the pixel row 42G is set to 12 lines. However, this is just one example, and it is preferable that this distance is determined based on a size or appearance frequency of dust to be detected.

Next, detection of stripes, which appear in the output image when dust adheres to only a position of the optical path of either one of pixel rows positioned at both ends of the pixel rows 41R, 41G, 41B, that is, either one of 41R or 41B is described.

Figure 5:
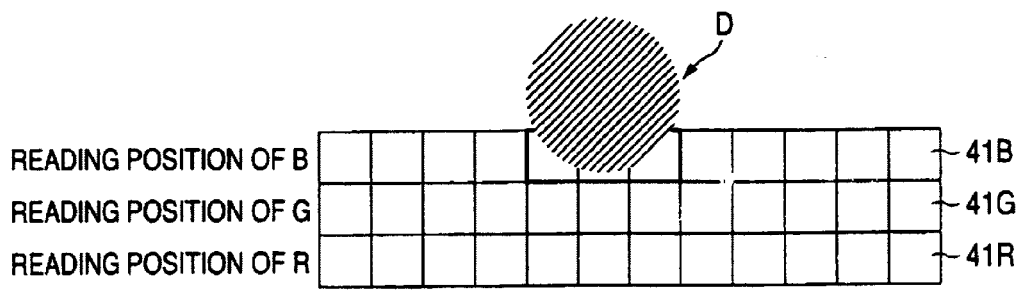
FIG. 5 is a drawing (case 1) showing the positional relationship between the reading positions of the pixel rows on the contact glass and adhering dust.
Figure 6:
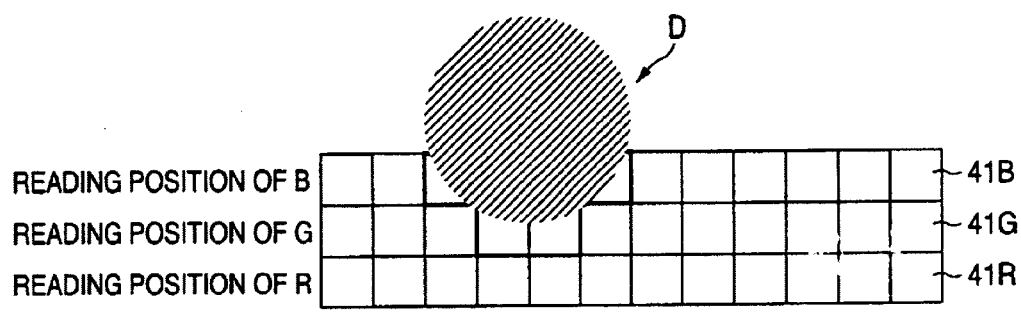
FIG. 6 is a drawing (case 2) showing the positional relationship between the reading positions of the pixel rows on the contact glass and adhering dust.

FIG. 5 and FIG. 6 are drawings showing positional relationship between reading positions of the pixel rows and adhesion of dust on the contact glass 14. In FIG. 5 and FIG. 6, the reading positions of the three pixel rows are in order of the pixel rows 41R, 41G, and 41B, which correspond to the spectral sensitivities of R, G, and B from the lower side of each figure. These positions are defined as an R reading position, a G reading position, and a B reading position. Framed rectangles show positions of the reading pixels, and among them, the rectangles framed by thick lines show pixel positions involving stripes caused by adhesion of dust D.

Figure 7:
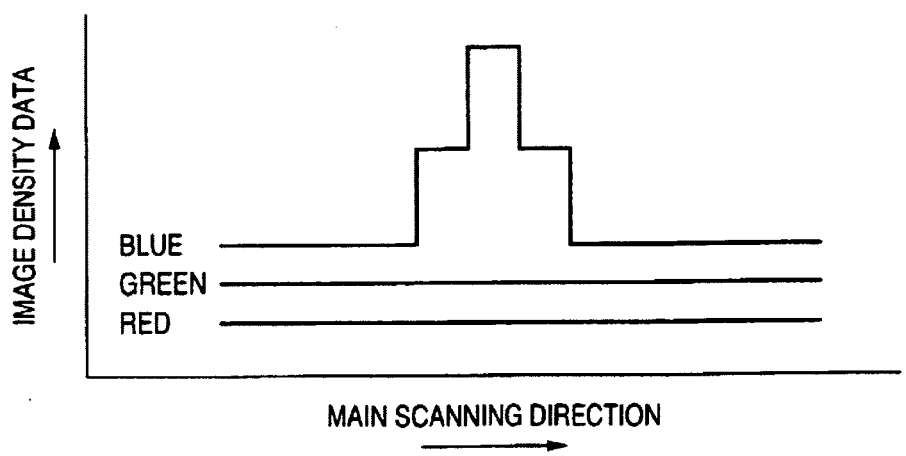
FIG. 7 is a timing chart showing read image data of the respective three pixel rows.

FIG. 7 is a timing chart showing read image data of the respective three pixel rows 41R, 41G, and 41B. In the timing chart of FIG. 7, the horizontal axis indicates the pixel position in the main scanning direction (direction orthogonal to the feeding direction), and the vertical axis shows the image density data.

In a condition shown in FIG. 5, the dust D adheres to only the B reading position, and does not adhere to the G and R reading positions. In this condition, stripes cannot be detected by the abovementioned comparison between the reading result of the pixel row 41G and the reading result of the pixel row 42G. Therefore, it is necessary to detect the stripes by another method. In this condition, the following five phenomena occur.

First, it is judged that no stripe exists by comparing the reading result of the pixel row 41G and the reading result of the pixel row 42G. Second, image data of a pixel corresponding to the reading position to which the dust D adheres has a difference from image data of the pixels in the front and rear sides in the main scanning direction so that the corresponding image data changes as shown in FIG. 7. Third, since the pixel row 41B corresponding to the spectral sensitivity of B continues reading until no dust adhesion is detected, the change of the second phenomenon occurs in a predetermined number of lines in the sub-scanning direction. Fourth, the change of the second phenomenon occurs in three pixels or less.

Herein, the reason for three pixels or less will be described below. When the dust, which causes stripes over four pixels or more adheres as shown in FIG. 6, the dust reaches the G reading positions, so that the stripes are detected by comparing the reading result of the pixel row 41G and the reading result of the pixel row 42G. Therefore, this phenomenon occurs under a condition that the spectral sensitivity characteristic of the pixel row 42G positioned separate from the three pixel rows 41R, 41G, and 41B is the same as that of the pixel row positioned at the center of the three pixel rows 41R, 41G, and 41B, that is, the pixel row 41G.

Furthermore, the number of pixels with stripes in this phenomenon is specified to three in this embodiment, however, it must be changed in accordance with the dust shape and the arrangement pitches of the three pixel rows 41R, 41G, and 41B. Fifth, the dust D does not adheres to the R reading positions, no change occurs in the main scanning direction in the read image data of the pixel row 41R corresponding to the spectral sensitivity of R.

When all of the abovementioned five phenomena occur, it is judged that stripes occur due to the dust D adhering to the reading positions of the corresponding pixels. Thereby, stripes can be detected, which appear in an output image when dust adheres to only the position of the optical path of either one of the pixel rows 41R and 41B positioned at both ends of the three pixel rows 41R, 41G, and 41B on the contact glass.

Next, for pixels on which stripes have been detected in the sub-scanning direction, the principle of elimination of the stripes is described.

Figure 8:
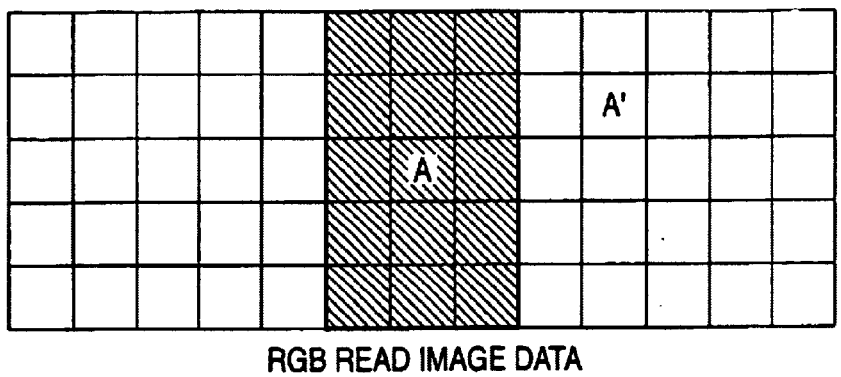
FIG. 8 are diagrams showing read image data in a window of 13 pixels in the main scanning direction×5 pixels in the sub-scanning direction in a case where a noise detected by the first reading unit is eliminated.
Figure 8:
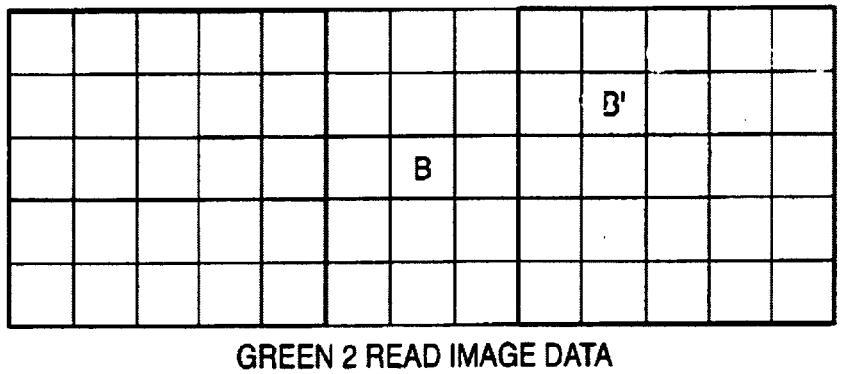
Figure 8:
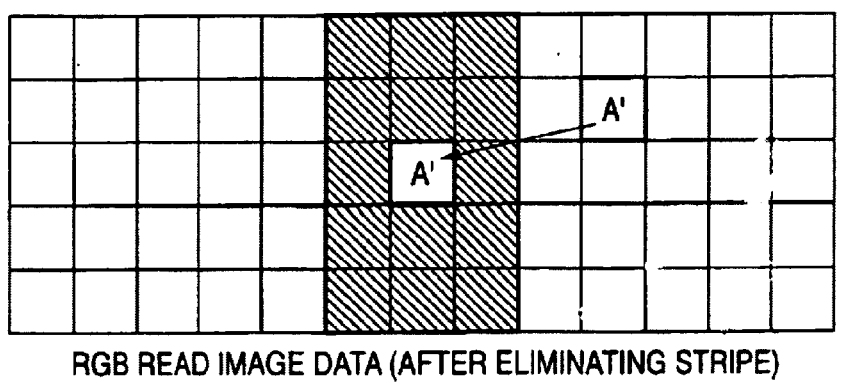

First, elimination of the stripes detected by the pixel rows 41R, 41G, and 41B is described. FIG. 8 show read image data in a window of 13 pixels in the main scanning direction×5 pixels in the sub-scanning direction.

In the window shown in FIG. 8, (A) shows read image data of the respective three pixel rows 41R, 41G, and 41B, (B) shows read image data of the separated one pixel row 42G (Green 2), and (C) shows read image data of the respective three pixel rows 41R, 41G, and 41B after eliminating stripes. In FIGS. 8(A), (B), and (C), the reading positions of the respective pixels match each other. Furthermore, the central pixel in the window is set as a focused pixel A to be subjected to stripe elimination and pixels with stripes caused by dust adhesion are shaded with diagonal lines.

As shown in FIGS. 8(A) and 8(B), stripes appear due to dust adhesion at the central three pixels in the main scanning direction of the read image data of the pixel rows 41R, 41G, and 41B, which include the focused pixel A. However, no stripe occurs in the read image data of the pixel row 42G. In this case, in a region of pixels (stripe excluding region) of the read image data of the pixel row 42G at the same positions as the pixels with no stripes of the read image data of the pixel rows 41R, 41G, and 41B, a pixel B', which has data the most similar to the density data of the focused pixel B in the image data of the pixel row 42G is calculated and determined as a replacement target pixel.

A pixel A' in the image data R, G, and B, which is at the same pixel position as this replacement target pixel has information most similar to the read image data at the focused pixel A in the condition where no stripe exists on the document. Therefore, as shown in FIG. 8 (C), this pixel A' is determined as a replacing pixel, and the focused pixel A containing stripes is replaced with the replacing pixel A' so that the stripes occurring in the output of the pixel rows 41R, 41G, 41B can be eliminated.

In the present embodiment, the dimensions of the window are 13 pixels in the main scanning direction×5 pixels in the sub-scanning direction. However, this is only one example, and it is preferable that this window is determined depending on the size of the dust to be eliminated.

Figure 9:
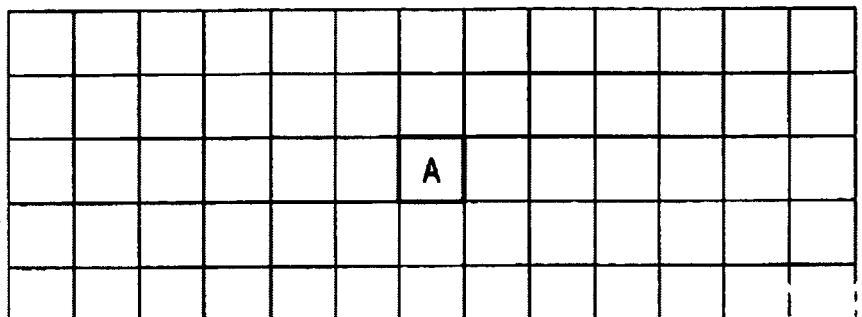
FIG. 9 are diagrams showing read image data in a window of 13 pixels in the main scanning direction×5 pixels in the sub-scanning direction in a case where a noise detected by the second reading unit is eliminated.
Figure 9:
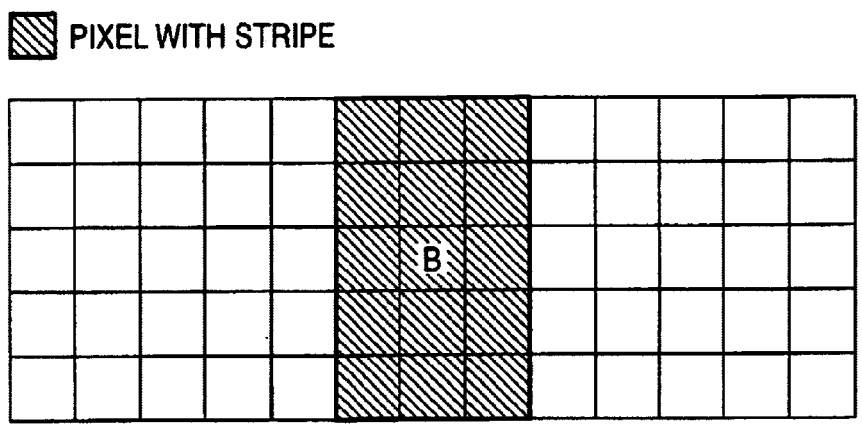
Figure 9:
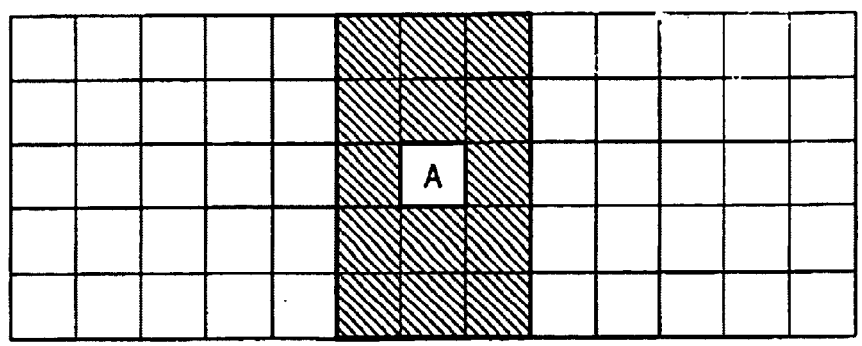

Next, elimination of stripes detected by the pixel row 42G will be described. FIG. 9 show read image data in a window of 13 pixels in the main scanning direction×5 pixels in the sub-scanning direction.

In the window shown in FIG. 9, (A) shows read image data of G among the three pixel rows 41R, 41G, and 41B, (B) shows read image data of the separated one pixel row 42G, and (C) shows read image data of the pixel row 42G after eliminating stripes. In FIGS. 9(A), (B), and (C), the respective pixel reading positions match each other. Furthermore, the central pixel of the window is defined as a focused pixel A, which is a target of stripe elimination, and pixels with stripes caused by dust adhesion are shaded with diagonal lines.

As shown in FIGS. 9(A) and 9(B), stripes are caused by dust adhesion to the central three pixels in the main scanning direction in the read image data of the pixel row 42G (Green 2) including the focused pixel, however, no stripe exists in the read image data of the pixel row 41G (Green). In this case, the spectral sensitivities of both pixel rows 41G and 42G are of G. Therefore, the image data of the pixels of 41G, which are at the same positions as those of the pixels with stripes in the read image data of the pixel row 42G, are equivalent to the read image data of the pixel row 42G, which is read without stripes.

Therefore, as shown in FIG. 9(C), by replacing the focused pixel B with stripes in the read image data of the pixel row 42G with the read image data of the pixel A of 41G at the same position, stripes occurring in the output of the pixel row 42G can be eliminated.

In the present embodiment, the pixel row positioned separate from the three pixel rows 41R, 41G, and 41B, which have the spectral sensitivity characteristics of R, G, and B, respectively, is defined as the pixel row 42G having the spectral sensitivity characteristic of G. It has been generally known that this G color component has the widest spectral characteristic region among the color components of R, G, and B. Therefore, stripes can be reliably detected regardless of color components of dust, which causes the stripes. The replacement target pixel for stripe elimination can be reliably calculated regardless of the document images.

In addition, a G output signal is known as a color component involving a high-level signal. Therefore, since it has a small noise level in comparison with the signal level, that is, has an excellent signal-to-noise ratio, stripe detection can be accurately carried out, and calculation of the replacement target pixel in stripe elimination can be reliably carried out.

Next, details of the stripe correcting circuit 58, which carries out various processing such as stripe detection and stripe elimination based on the abovementioned principle, are described.

Figure 10:
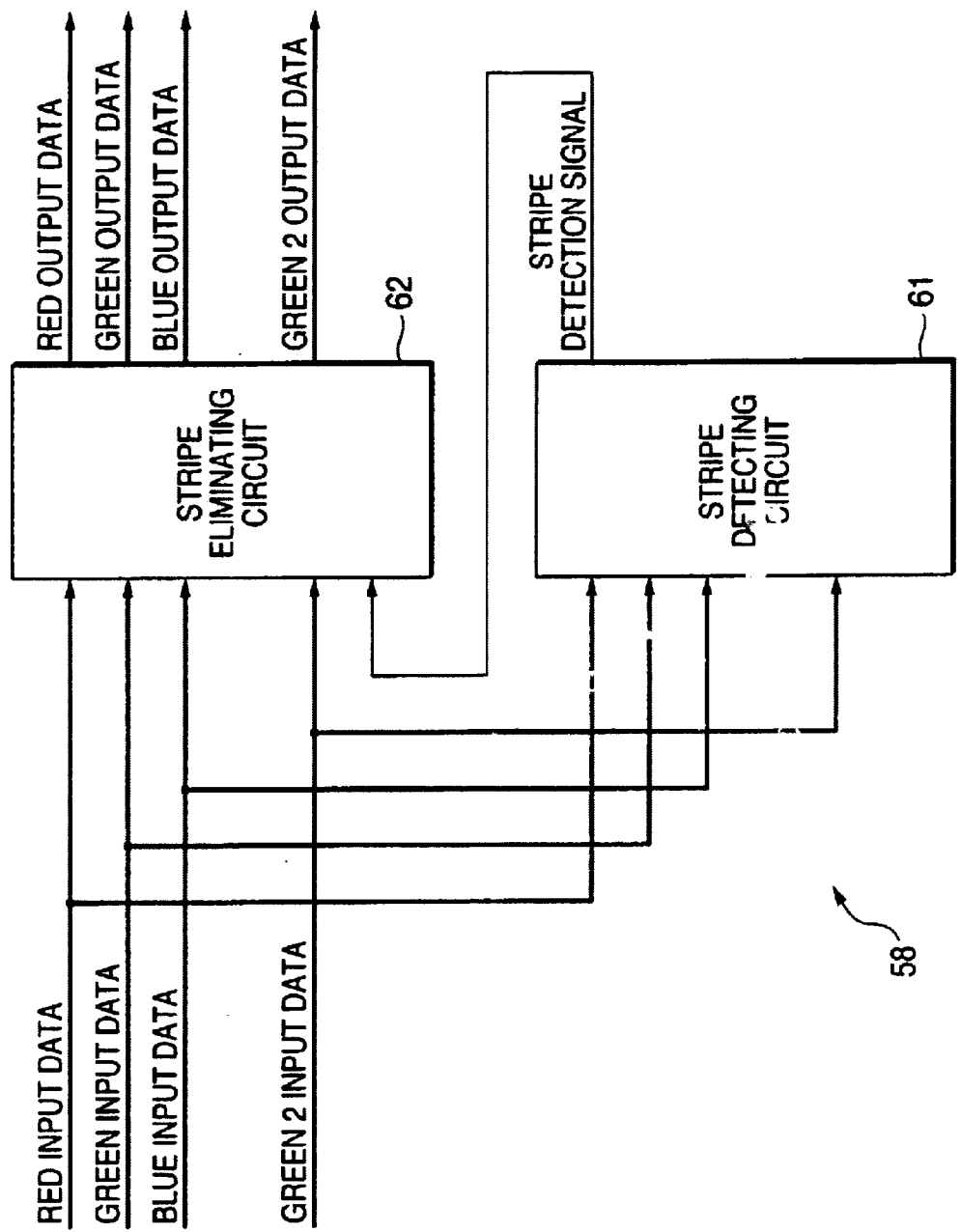
FIG. 10 is a block diagram showing an example (first construction example) of the construction of the stripe correcting circuit.

FIG. 10 is a block diagram showing an example of the construction of the stripe correcting circuit 58. As apparently shown in FIG. 10, the stripe correcting circuit 58 includes a stripe detecting circuit 61 and a stripe eliminating circuit 62. The stripe detecting circuit 61 detects the occurrence of stripes from the image data and outputs a stripe detection signal for specifying pixels with stripes occurring. This stripe detection signal is supplied to the stripe eliminating circuit 62. The stripe eliminating circuit 62 eliminates stripes based on the stripe detection signal supplied from the stripe detecting circuit 61 and the image data, and outputs image data without stripes occurring.

Figure 11:
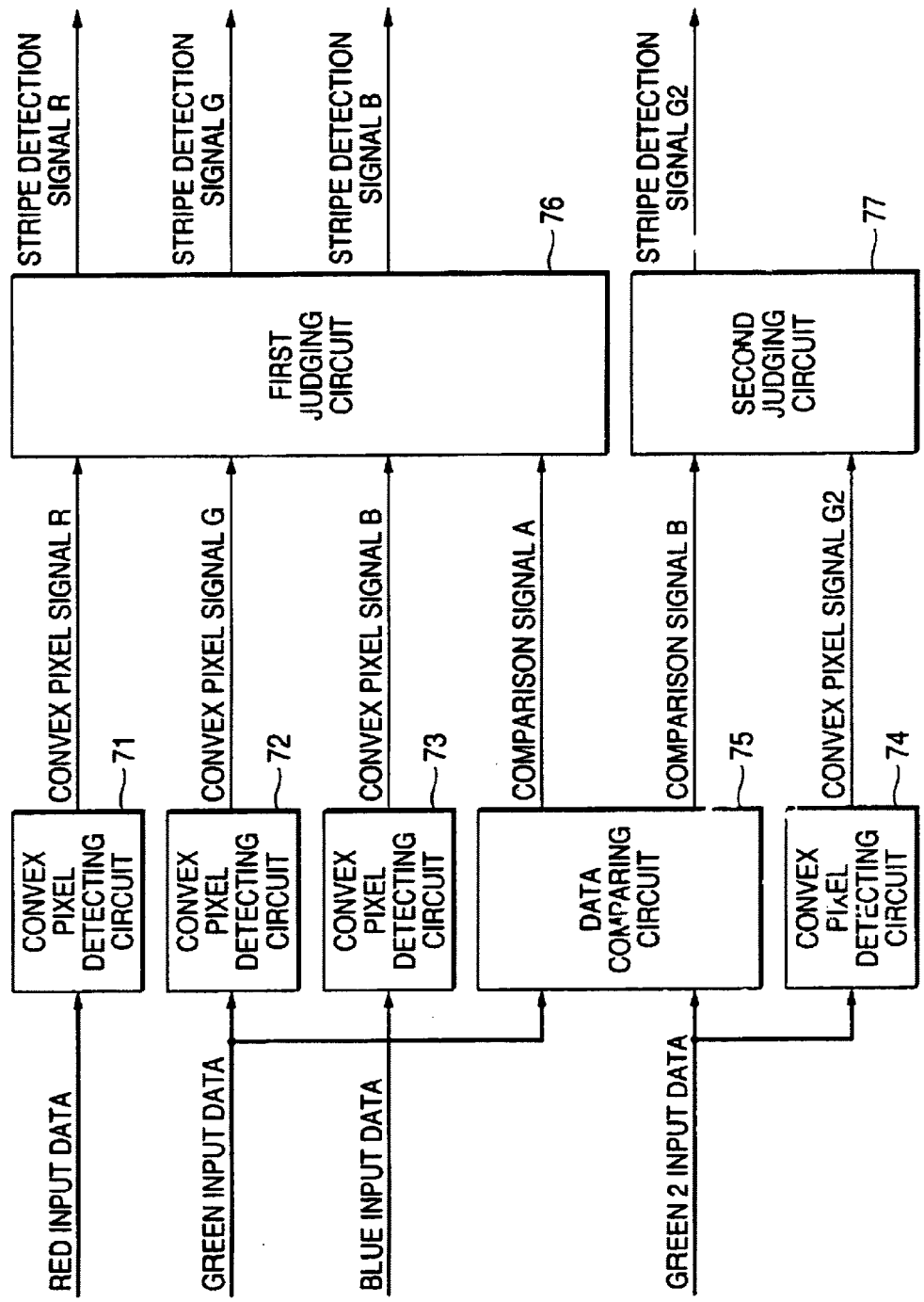
FIG. 11 is a block diagram showing an example of the construction of the stripe detecting circuit.

Between the stripe detecting circuit 61 and the stripe eliminating circuit 62, first, details of the stripe detecting circuit 61 are described. FIG. 11 is a block diagram showing an example of the construction of the stripe detecting circuit 61.

As apparently shown in FIG. 11, the stripe detecting circuit 61 has four convex pixel detecting circuits 71 to 74, a data comparing circuit 75, a first judging circuit 76, and a second judging circuit 77. The four convex pixel detecting circuits 71 to 74 detect changes of the image data in the main scanning direction from the read image data of the respective pixel rows 41R, 41G, and 41B, and the pixel row 42G, and output convex pixel signals R, G, B, and G2. The data comparing circuit 75 compares the densities of the image data of the pixel row 41G and the pixel row 42G, and outputs comparison signals A and B as the comparison results.

The first judging circuit 76 detects stripes occurring in the pixel rows 41R, 41G, and 41B based on the convex pixel signals R, G, and B output from the convex pixel detecting circuits 71, 72, and 73 and the comparison signal A output from the data comparing circuit 75, and outputs stripe detection signals R, G, and B. The second judging circuit 77 detects stripes occurring at the pixel row 42G based on the convex pixel signal G2 output from the convex pixel detecting circuit 74 and the comparison signal B output from the data comparing circuit 75, and outputs a stripe detection signal G2.

Figure 12:
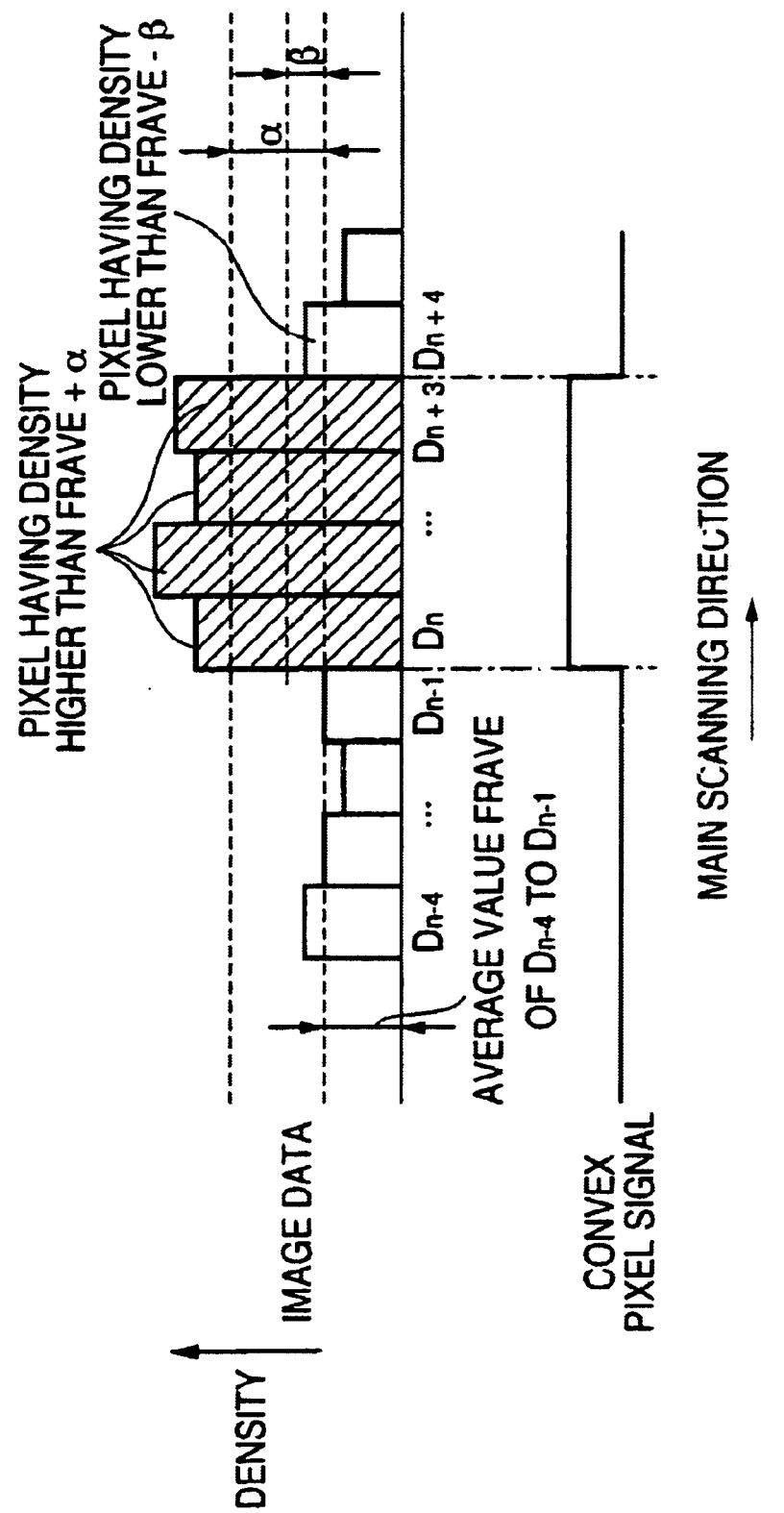
FIG. 12 is an operation explanatory view of the convex pixel detecting circuits.

FIG. 12 is an operation explanatory view of the convex pixel detecting circuits 71, 72, and 73 in the stripe detecting circuit 61. The convex pixel detecting circuits 71, 72, and 73 detect a pixel having a so-called convex shape in density when viewed in the main scanning direction. The pixel having the convex shape has the density larger than an average value of densities of a plurality of preceding pixels in the main scanning direction of each image data, by a predetermined value. Pixels data following the pixle having the convex shape in the main scanning direction has a density around the average value of the preceding pixels.

FIG. 12 shows relationship between the densities of the pixel data with continuity in the main scanning direction and the convex pixel signal of the detection results. A pixel Dn is set as a focused pixel. An average value of densities of pixels $D_{n-4}$ to $D_{n-1}$ preceding the focused pixel Dn is defined as FRAVE. Comparison between the average value FRAVE and the density of the focused pixel Dn and comparison between the average value FRAVE and the pixel following the focused pixel Dn in the main scanning direction are carried out.

Then, when the density of the focused pixel Dn is not lower than sum of a predetermined value a and the average value FRAVE and a pixel Dn+4 having a density lower than FRAVE+β exists among pixels, which locate rear of the focused pixel Dn, pixels from the focused pixel Dn to the pixel Dn+3 just before the pixel Dn+4 are judged as convex pixels. Therefore, the convex pixel signals set as logical "1" are output.

By changing the number of pixels to be compared with FRAVE+β at the rear of this focused pixel Dn, the width of the detected convex pixels can be limited. Concretely, only convex pixels are detected, which have width lower than the set number of pixels. For example, when the number of pixels to be compared is set to three, in FIG. 12, no pixels the densities of which are FRAVE+β or less exist among the pixels Dn+1, Dn+2, and Dn+3 following the focused pixel Dn, so that they are not detected as convex pixels. This processing is applied to the pixel rows 41R, 41G, and 41B and the pixel row 42G, respectively, and the results are set as a convex pixel signal R, a convex pixel signal G, a convex pixel signal B, and a convex pixel signal G2, respectively.

Figure 13:
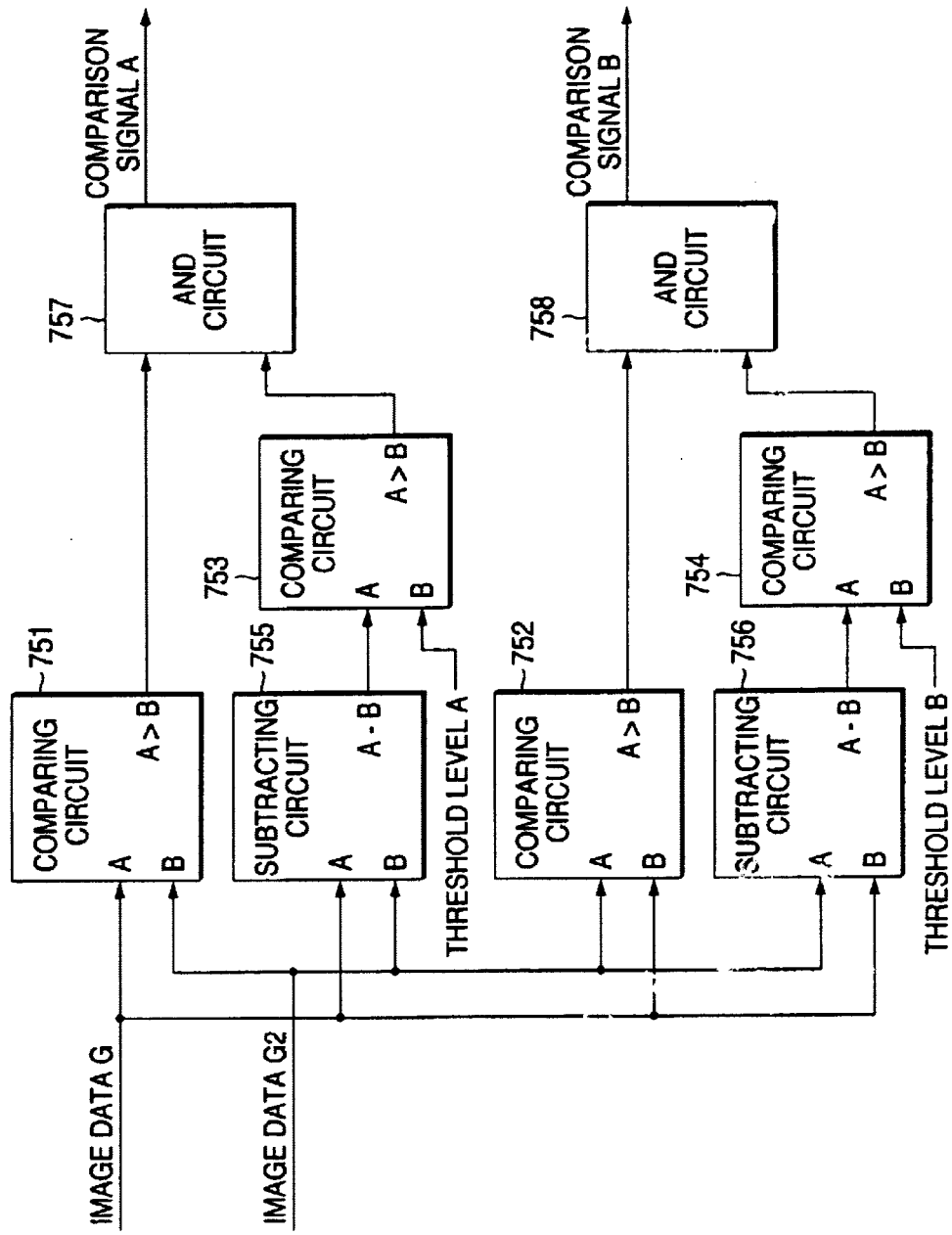
FIG. 13 is a block diagram showing an example of the construction of the data comparing circuit.

FIG. 13 is a block diagram showing an example of the construction of the data comparing circuit 75 in the stripe detecting circuit 61. As shown in FIG. 13, the data comparing circuit 75 includes four comparing circuits 751 to 754, two subtracting circuits 755 and 756, and two AND circuits 757 and 758.

The comparing circuit 571 defines the image data of the pixel row 41G (Green) (hereinafter, referred to as "image data G") as a comparing input A and the image data of the pixel row 42G (Green 2) (hereinafter, referred to as "image data G2") as a comparing input B and carries out density comparison for each pixel. When the pixel data G has higher density, that is, A>B, the comparing circuit 571 outputs a comparison result of logical "1". The comparing circuit 752 defines the image data G2 as a comparing input A and the image data G as a comparing input B and carries out density comparison for each pixel. When the pixel data G2 has higher density, that is, A>B, the comparing circuit 752 outputs a comparison result of logical "1".

The subtracting circuit 755 defines the image data G as an input A and the image data G2 as an input B and outputs density differences (A–B) between these image data G and G2 for each pixel. The subtracting circuit 756 defines the image data G2 as an input A and the image data G as an input B and outputs density differences (A–B) between these image data G2 and G for each pixel.

The comparing circuit 753 defines the subtracting output of the subtracting circuit 755 as an input A and a threshold level A set by the CPU 60 of FIG. 4 as an input B. When the density difference between the image data G and the image data G2 is larger than the threshold level A, the comparing circuit outputs logical "1". The comparing circuit 754 defines the subtracting output of the subtracting circuit 756 as an input A and a threshold level B set by the CPU 60 as an input B. When the density difference between the image data G2 and the image data G is larger than the threshold level B, the comparing circuit 754 outputs logical "1".

The AND circuit 757 defines the comparison results of the comparing circuits 751 and 753 as two inputs, and calculates logical product of the two inputs to output a comparison signal A. The AND circuit 758 defines the comparison results of the comparing circuits 752 and 754 as two inputs, and calculates logical product of the two inputs to output a comparison signal B.

Incidentally, in the processing of the data comparing circuit 75 constructed as mentioned above, it is assumed that the density of stripes caused by dust adhesion is larger than the document images. However, it is also possible to detect stripes the density of which is lower than that of the document image by inverting the comparison processing direction of each circuit, specifically, by changing the comparison processing (A>B) in the comparing circuits 751 to 754 into comparison processing (B>A).

Figure 14:
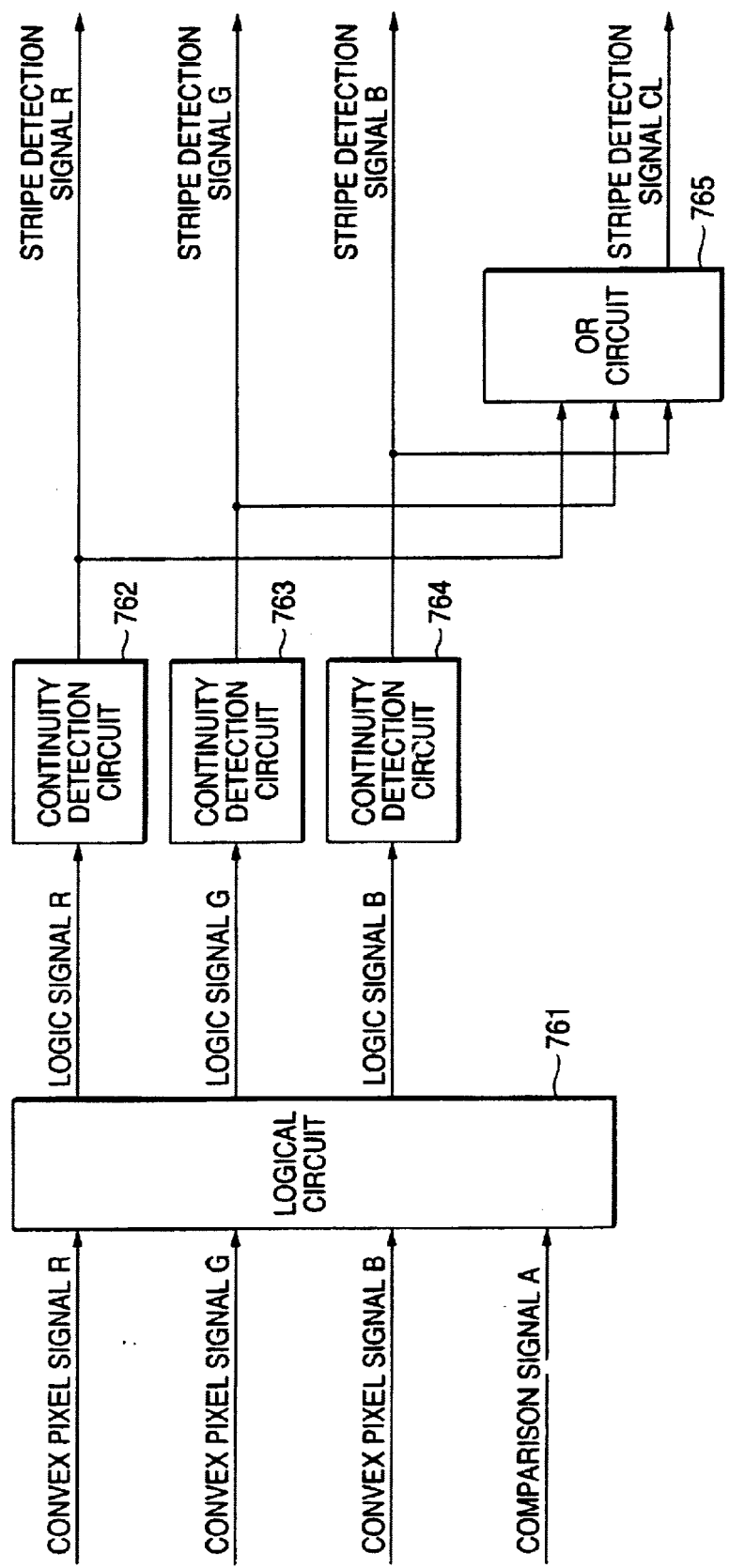
FIG. 14 is a block diagram showing an example of the construction of the first judging circuit.

FIG. 14 is a block diagram showing an example of the construction of the first judging circuit 76 in the stripe detecting circuit 61. As shown in FIG. 14, the first judging circuit 76 includes a logical circuit 761, three continuity detecting circuits 762, 763, and 764, and an OR circuit 765.

The logical circuit 761 outputs logic signals R, G, and B in accordance with the convex pixel signals R, G, and B and the logic of the comparison signal A. The continuity detecting circuits 762, 763, and 764 detect continuity in the sub-scanning direction of the logic signals R, G, and B output from the logical circuit 761 and outputs stripe detection signals R. G, and B. The OR circuit 765 calculates logical sum of the stripe detection signals R, G, and B output from the continuity detecting circuits 762, 763, and 764, and sets the logical sum result as a stripe detection signal CL.

FIG. 15 shows a logical table of the logical circuit 761. The logical circuit 761 carries out logical operation of the convex pixel signals R, G, and B and the comparison signal A based on this logical table to output logic signals R, G, and B. One of the purposes of this logical operation is to detect that only the convex pixel signal R or the convex pixel signal B becomes logical "1", that is, to detect stripes appearing in an output image when dust adheres to only a position of the optical path of either one of the R or B pixel rows 41R or 41B, which are positioned at both ends of the three pixel rows 41R, 41G, and 41B.

Another purpose is to detect that both the comparison signal A and the convex signal G become logical "1", that is, to prevent erroneous detection of stripes caused by dust adhesion to the pixel row 42G (pixel rows 41R, 41G, and 41B) at a different side from the pixel rows 41R, 41G, and 41B (pixel row 42G) intended to detect stripes. For example, when stripes the density of which is low in comparison with that of the document are caused by dust adhesion to the pixel row 42G, it is prevented that the densities of the read image data of pixel rows 41R, 41G, and 41B become higher than that of the read data of the pixel row 42G and the output of the data comparing circuit 75 becomes equal to a case where stripes the density of which is higher than that of the document are caused by dust adhesion to the pixel rows 41R, 41G, and 41B.

The logic signals R, G, and B processed by the logical circuit 761 are input into the continuity detecting circuits 762, 763, and 764. The continuity detecting circuits 762, 763, and 764 are provided to prevent erroneous detection due to a noise contained in the image data or a change in document feeding speed. When the image data contains a noise, there is a possibility that the convex pixel signals R, G, and B and the comparison signal A for the interested pixels become logical "1". Furthermore, when the document feeding speed changes, reading positions of pixels to be compared, that is, the reading position of the image data of the pixel row 41G and the reading position of the image data of the pixel row 42G become different from each other, there is a possibility that the logic of the comparison signal A becomes "1".

However, either case occurs over several lines at most in the sub-scanning direction. On the other hand, stripes caused by dust adhesion continuously occur in the identical pixels over at least several tens of lines or more in the main scanning direction. Therefore, when such detection results are continuously obtained in a predetermined number of lines or more in the sub-scanning direction, the results can be judged as stripes.

Figure 16:
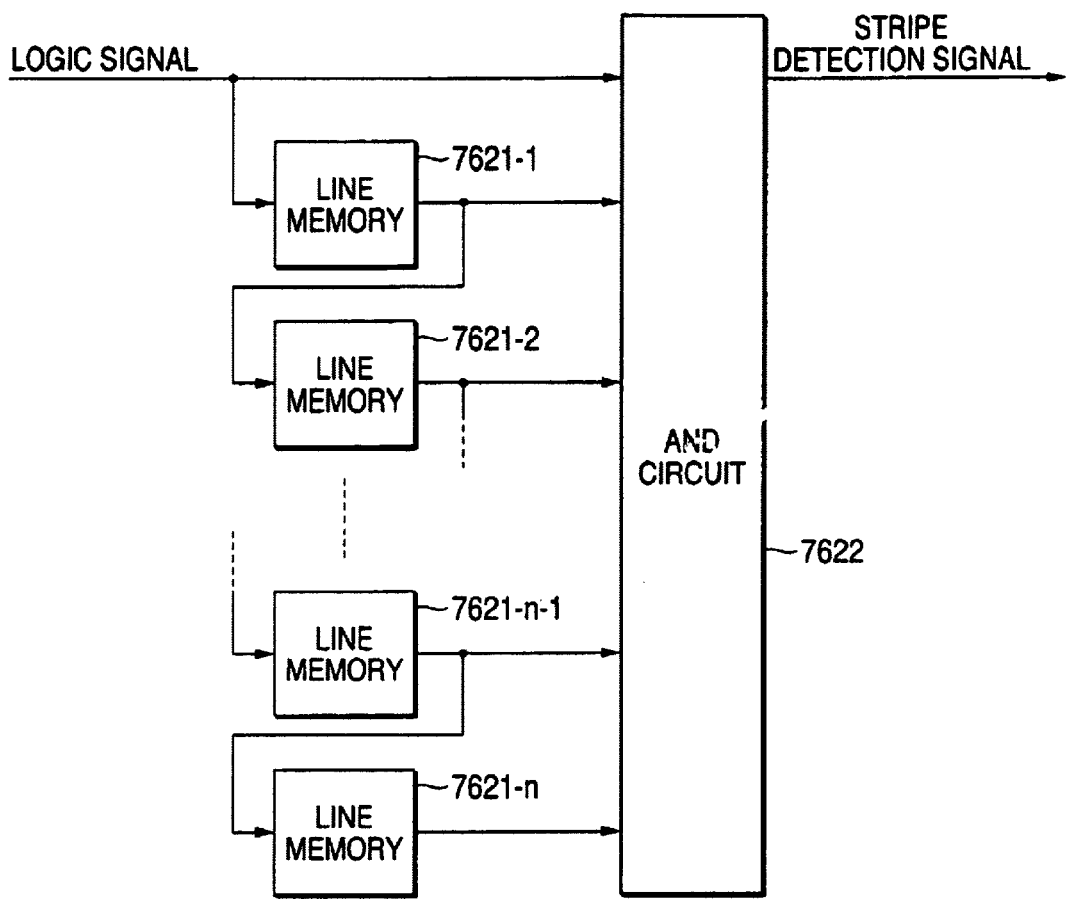
FIG. 16 is a block diagram showing an example of the construction of the continuity detecting circuit.

FIG. 16 is a block diagram showing an example of the construction of the continuity detecting circuits 762, 763, and 764 in the first judging circuit 76. The continuity detecting circuits 762, 763, and 764 employ the same construction so that the construction of the continuity detecting circuit 762 is described as an example.

As shown in FIG. 16, the continuity detecting circuit 762 includes n of line memories 7621-1 to 7621-n and an AND circuit 7622. The line memories 7621-1 to 7621-n successively delay the input logic signals R in turn by time corresponding to one line, and output them as signals delayed by times of 1 to n lines, respectively, from the logic signals R.

The AND circuit 7622 receives the input logic signals R and the output signals from the line memories 7621-1 to 7621-n as inputs. When all of these are logical "1", that is, when all identical pixels of the logic signals R in the main scanning direction are logical "1" continuously over n+1 lines, the AND circuit turns its output result (continuity detection result) to logical "1". Then, the output result of this continuity detecting circuit 762 becomes a stripe detection signal R.

The construction and operation of the continuity detecting circuits 763 and 764 are completely the same as those of the continuity detecting circuit 762, and the output results of these continuity detecting circuits 763 and 764 become a stripe detection signal G and a stripe detection signal B, respectively.

Incidentally, in the first judging circuit 76 shown in FIG. 14, the logical sum of the three stripe detection signals R, G, and B calculated in the OR circuit 765 is output as a stripe detection signal CL. The stripe detection signal CL indicates that stripe occurrence has also been detected in any one of the R, G, B image data.

Figure 17:
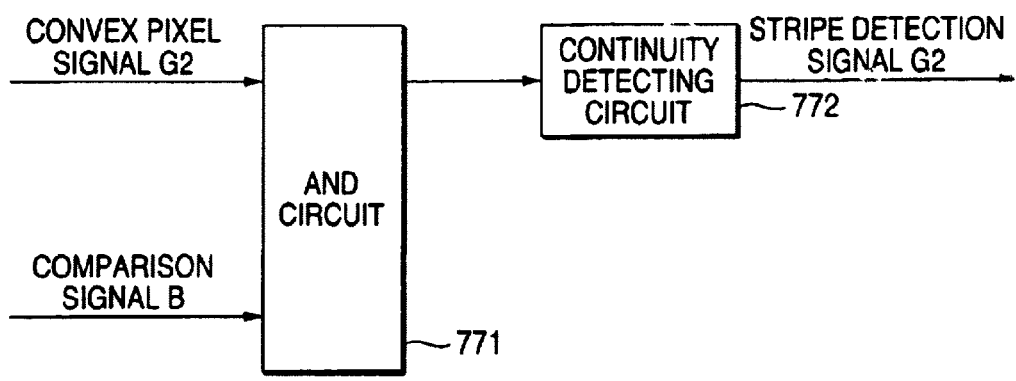
FIG. 17 is a block diagram showing an example of the construction of the second judging circuit.

FIG. 17 shows a block diagram showing an example of the construction of the second judging circuit 77 in the stripe detecting circuit 61. As shown in FIG. 17, the second judging circuit 77 includes an AND circuit 771 and a continuity detecting circuit 772. The AND circuit 771 determines the logical product of the comparison signal B and the convex pixel signal G2. Herein, the purpose of determination of the logical product is, as with the first judging circuit 76, to prevent erroneous detection of stripes caused by dust adhesion to the pixel rows 41R, 41G, 41B (pixel row 42G) at a different side from the pixel row 42G (pixel rows 41R, 41G, 41B) intended to detect stripes.

Furthermore, the purpose of providing the continuity detecting circuit 772 is, as with the continuity detecting circuits 762, 763, and 764 in the first judging circuit 76, to prevent erroneous detection due to a noise contained in image data or a change in the document feeding speed. The construction of the continuity detecting circuit 772 is also the same as that of the continuity detecting circuit 762 shown in FIG. 16. The output result of this continuity detecting circuit 772 becomes a stripe detection signal G2.

Figure 18:
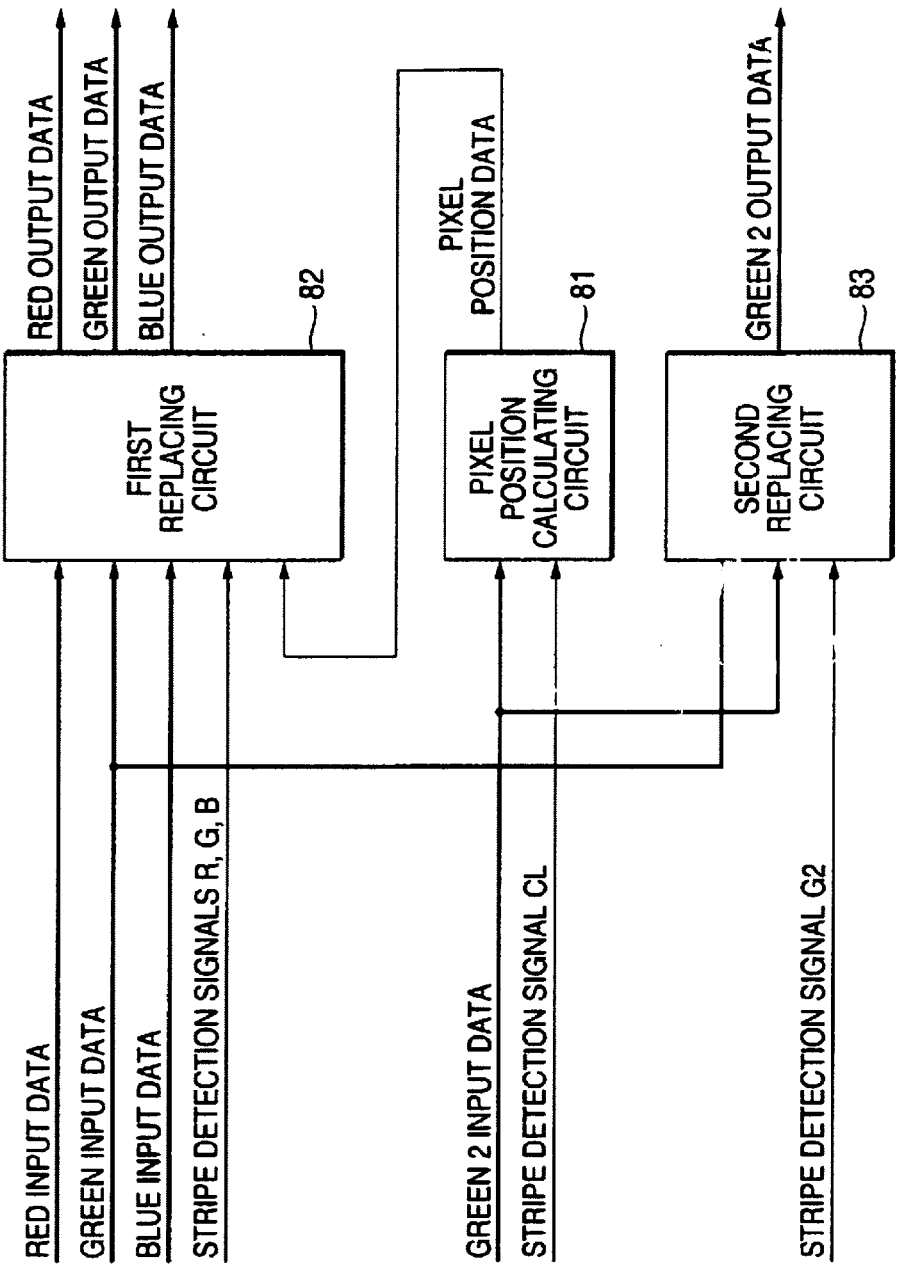
FIG. 18 is a block diagram showing an example of the construction of the stripe eliminating circuit.

Next, details of the stripe eliminating circuit 62 are described. FIG. 18 is a block diagram showing an example of the construction of the stripe eliminating circuit 62.

As shown in FIG. 18, the stripe eliminating circuit 62 includes a pixel position calculating circuit 81 and first and second replacing circuits 82 and 83. The pixel position calculating circuit 81 calculates the pixel position of a pixel to be replaced based on the read image data of the pixel row 42G. The first replacing circuit 82 eliminates stripes from each of the read image data of the pixel rows 41R, 41G, and 41R. The second replacing circuit 83 eliminates stripes from the read image data of the pixel row 42G.

Figure 19:
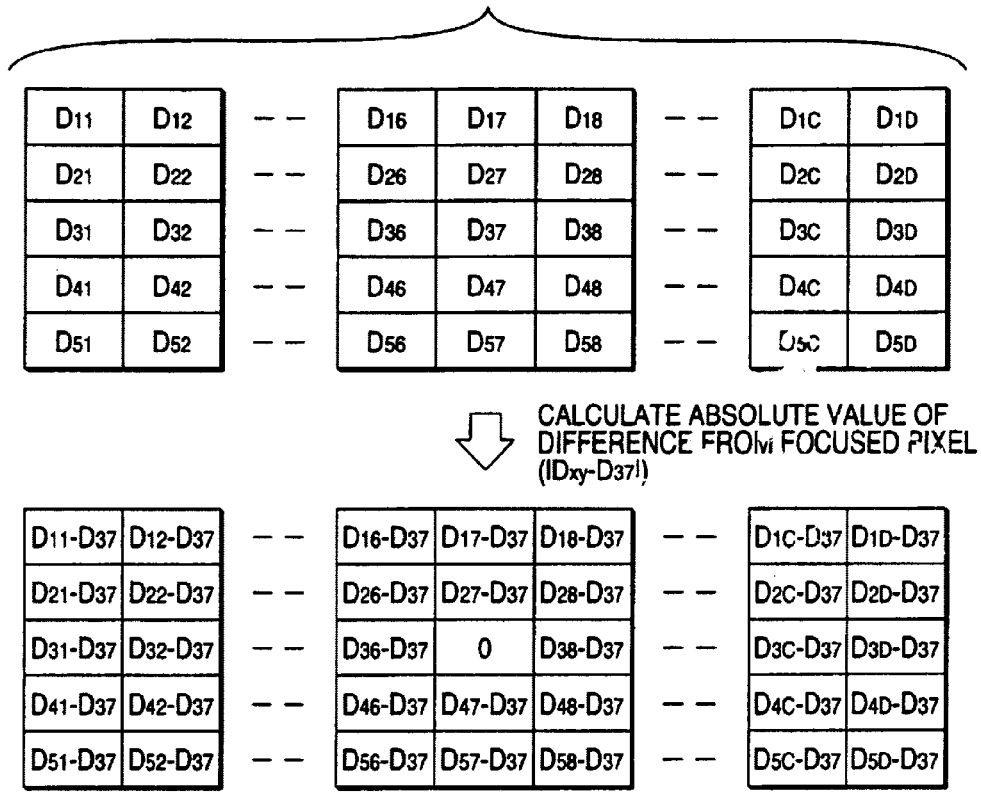
FIG. 19 is a diagram (case 1) showing read image data in a window of 13 pixels in the main scanning direction×5 pixels in the sub-scanning direction for explanation of operation of the pixel position calculating circuit.
Figure 20:
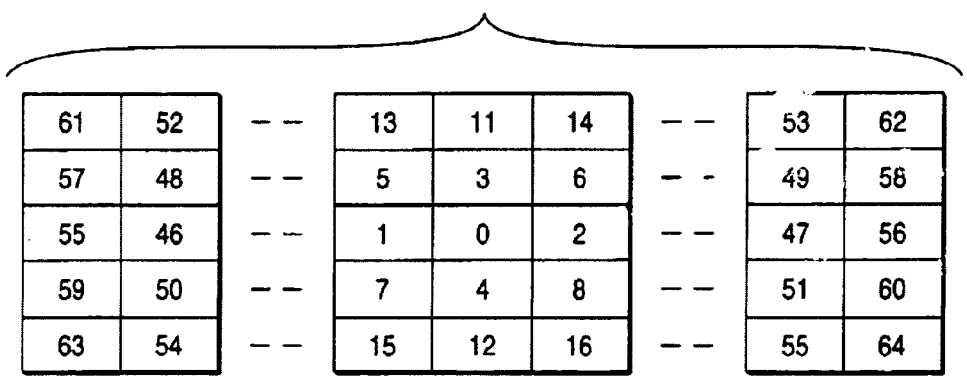
FIG. 20 is a diagram (case 2) showing read image data in a window of 13 pixels in the main scanning direction×5 pixels in the sub-scanning direction for explanation of operation of the pixel position calculating circuit.
Figure 21:
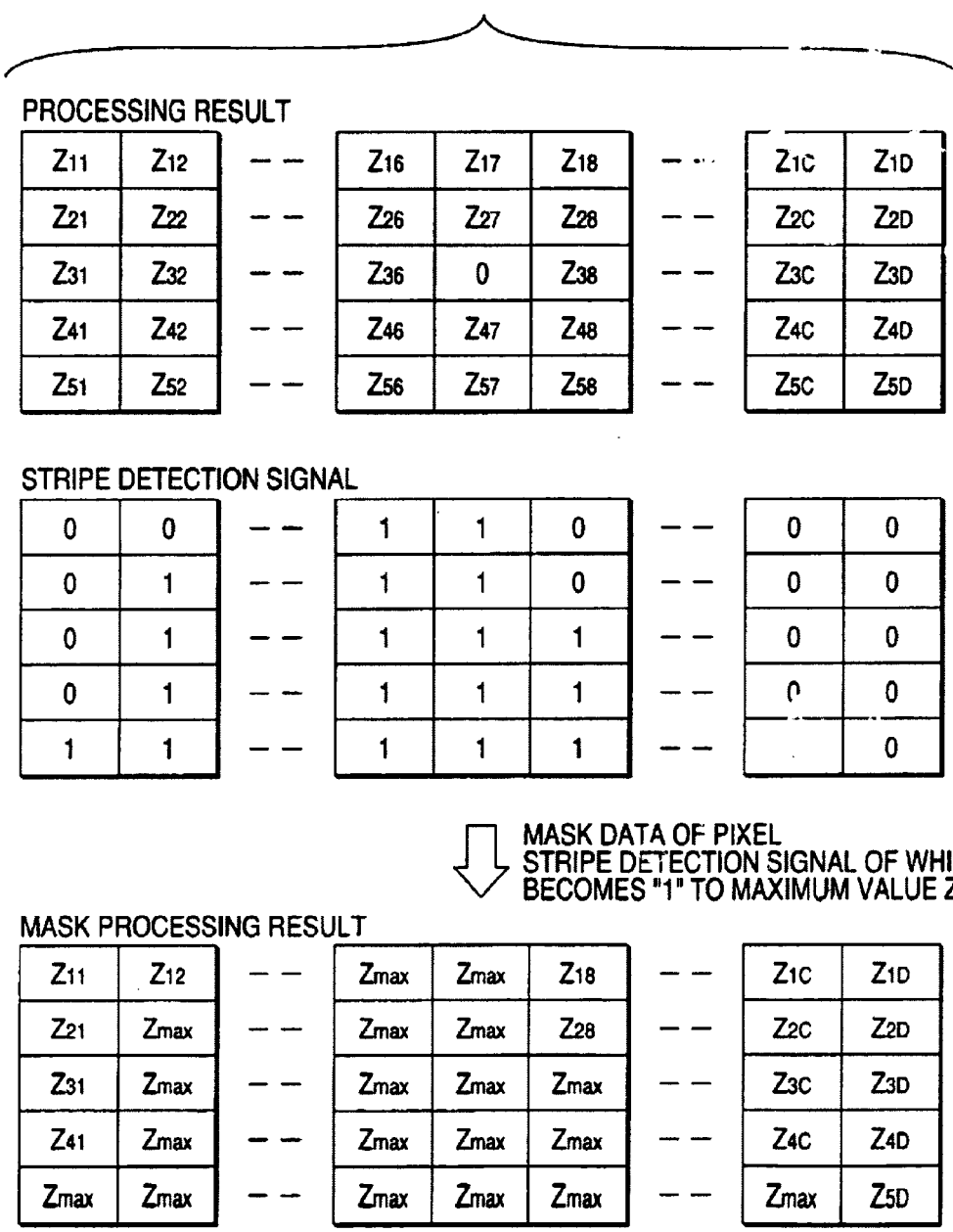
FIG. 21 is a diagram (case 3) showing read image data in a window of 13 pixels in the main scanning direction×5 pixels in the sub-scanning direction for explanation of operation of the pixel position calculating circuit.

FIG. 19 to FIG. 21 are diagrams showing read image data in windows of 13 pixels in the main scanning direction×5 pixels in the sub-scanning direction for explaining the operation of the pixel position calculating circuit 81. The pixel at a center of each window is defined as a focused pixel. In FIG. 19 to FIG. 21, data Dxy indicating the densities and processing results Zxy are shown in the respective pixels. The attached characters x and y indicate the pixel positions in the windows. The high-order digit x indicates the position in the sub-scanning direction. The low-order digit y indicates the position in the main-scanning direction. For example, density data of the focused pixel is D37.

In the pixel position calculating circuit 81, first, as shown in FIG. 19, the absolute value of the difference between the data Dxy of each pixel and the data D37 of the focused pixel is calculated. Then, a coefficient indicating a distance from the focused pixel thereto shown in FIG. 20 is added to this absolute value of the difference. The result of this addition is defined as Zxy. Therefore, Zxy=|Dxy−D37|+the coefficient. This coefficient value becomes larger as the distance from the focused pixel thereto becomes longer.

Next, as shown in FIG. 21, in the addition results Zxy, for pixels having logical "1" of the stripe detection signals CL, that is, pixels on which stripes have been detected, the addition results Zxy are replaced and masked with the maximum value Zmax of the data. This replacement with the maximum value is to prevent calculation of pixels, which have been detected as stripes in the R, G, and B read image data by making the differences between the pixels detected as stripes and the focused pixel maximum.

Last, among pixels having the minimum value in the data of the mask processing results shown in FIG. 21, that is, among pixels on which no stripes have been detected, a pixel having density data, which is closest to that of the focused pixel, is calculated. The pixel position data xy indicating the position of this pixel is output.

Figure 22:
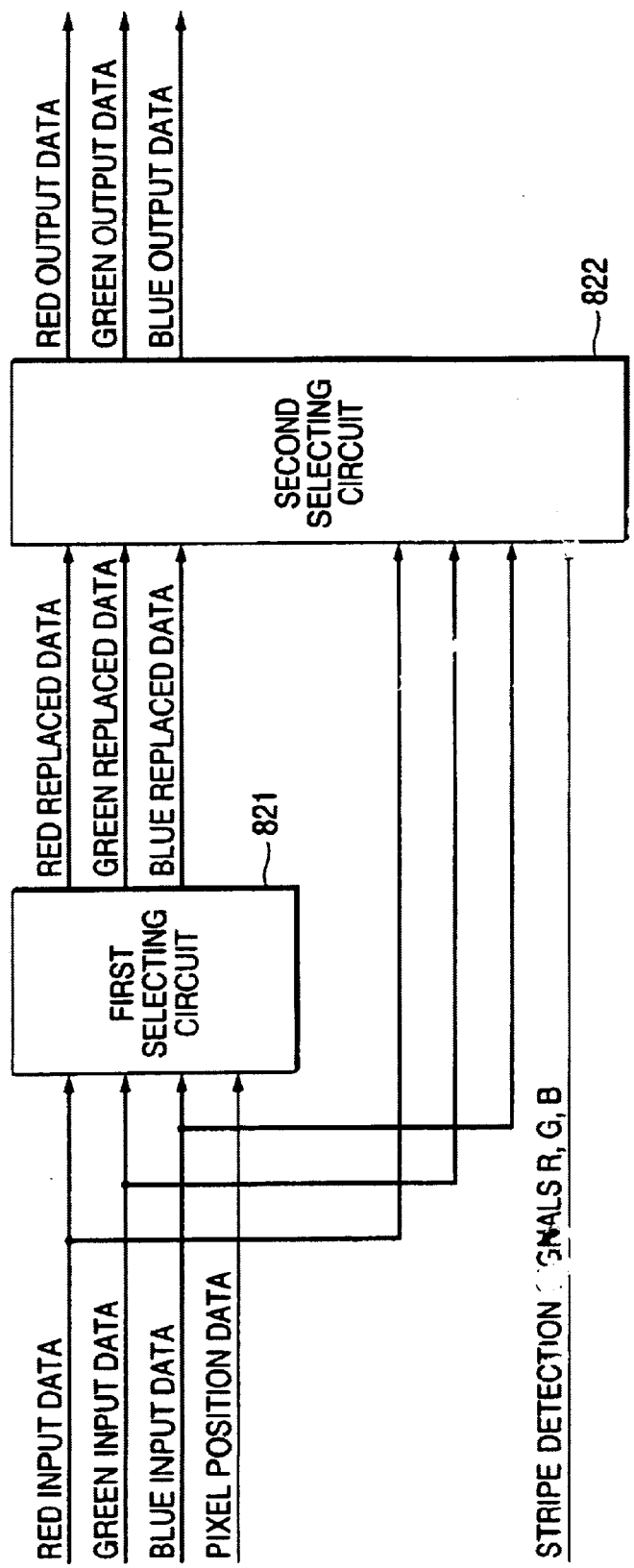
FIG. 22 is a block diagram showing an example of the construction of the first replacing circuit.

FIG. 22 is a block diagram showing an example of the construction of the first replacing circuit 82 in the stripe eliminating circuit 62. As shown in FIG. 22, the first replacing circuit 82 includes a first selecting circuit 821 and a second selecting circuit 822. The first selecting circuit 821 selects data of the pixel indicated by the pixel position data calculated by the pixel position calculating circuit 81. The second selecting circuit 822 selects and outputs the output results of the first selecting circuit 821 and input image data based on the stripe detection signals R, G, and B.

Figure 23:
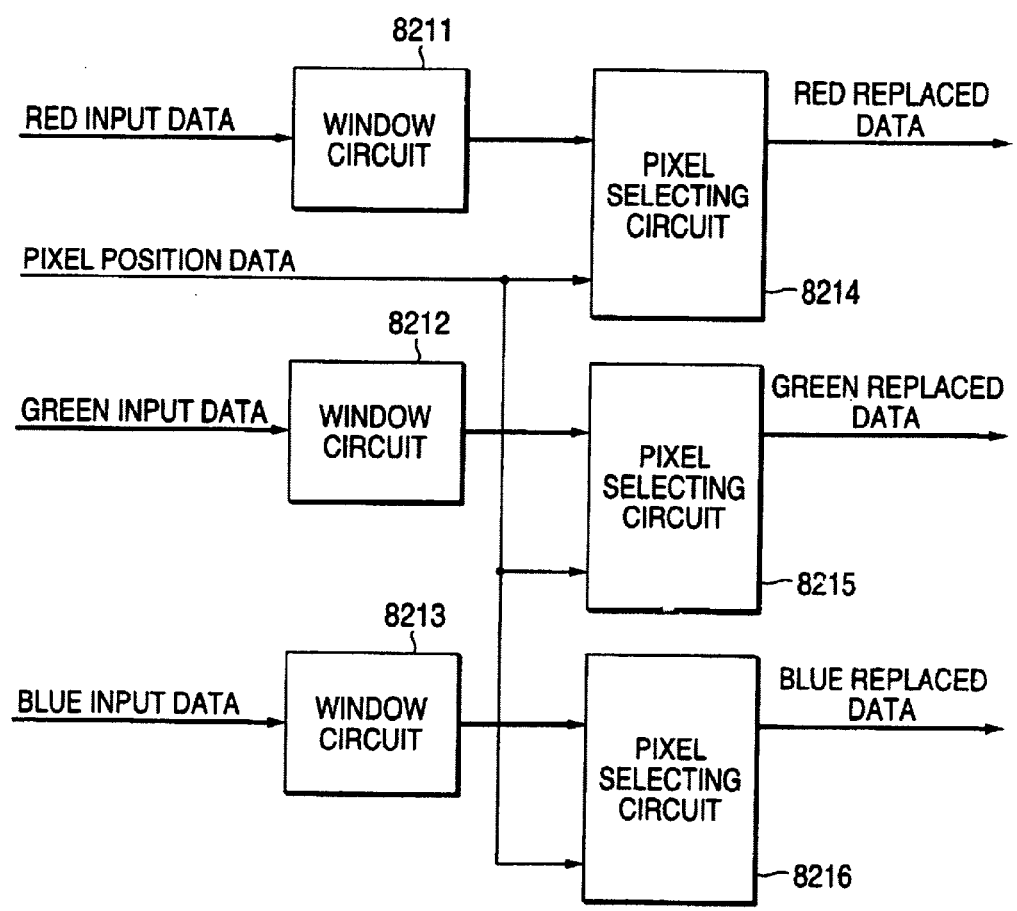
FIG. 23 is a block diagram showing an example of the construction of the first selecting circuit.

FIG. 23 is a block diagram showing an example of the construction of the first selecting circuit 821. As shown in FIG. 23, the first selecting circuit 821 includes three window circuits 8211, 8212, and 8213 and three pixel selecting circuits 8214, 8215, and 8216. The window circuits 8211, 8212, and 8213 expand each of read image data of the pixel rows 41R, 41G, and 41B to a window of 13 pixels in the main scanning direction×5 pixels in the sub-scanning direction. The pixel selecting circuits 8214, 8215, and 8216 select and output data of the pixel in the window, which is indicated by the pixel position data output from the pixel position calculating circuit 81.

FIG. 24 shows a logical table of the second selecting circuit 822. The second selecting circuit 822 selects and outputs image data to be output in accordance with the stripe detection signals R, G, and B and the logical table. Thereby, each of read image data of the pixel rows 41R, 41G, and 41B from which stripes have been eliminated is obtained. Concretely, with regard to a pixel the stripe detection signal G of which becomes logical "1", that is, a pixel on which stripes have been detected by comparing the read image data of the pixel row 41G and the read image data of the pixel row 42G, all R, G, and B images of the pixel are replaced with data of a peripheral pixel, which includes no stripes and has been calculated by the pixel position calculating circuit 81.

With regard to a pixel only the stripe detection signal R of which becomes logical "1", that is, a pixel on which occurrence of stripes has been detected in only the read image data of the pixel row 41R, only the R image thereof is replaced with data of a peripheral pixel, which includes no stripes and has been calculated by the pixel position calculating circuit. With regard to a pixel only the stripe detection signal B of which becomes logical "1", that is, a pixel on which occurrence of stripes has been detected in only the read image data of the pixel row 41B, only the B image is replaced with data of a peripheral pixel, which includes no stripes and has been calculated by the pixel position calculating circuit 81.

Regarding a pixel the stripe detection signal G2 of which is logical "1", that is, a pixel in which occurrence of stripes has been detected in the read image data of the pixel row 42G, the second replacing circuit 83 eliminates the stripes by outputting the read image data G as read image data G2.

The construction and operation of the stripe correcting circuit 58 described above are under the assumption that the reading operation speed of the pixel rows 41R, 41G, and 41B and the reading operation speed of the pixel row 42G are equal to each other.

Next, when reading of the pixel row 42G is operated at a twice speed as that of reading of the pixel rows 41R, 41G, and 41B, a stripe correcting circuit 58' according to another example of stripe detection and elimination from the read image data of the pixel row 42G will be described.

Figure 25:
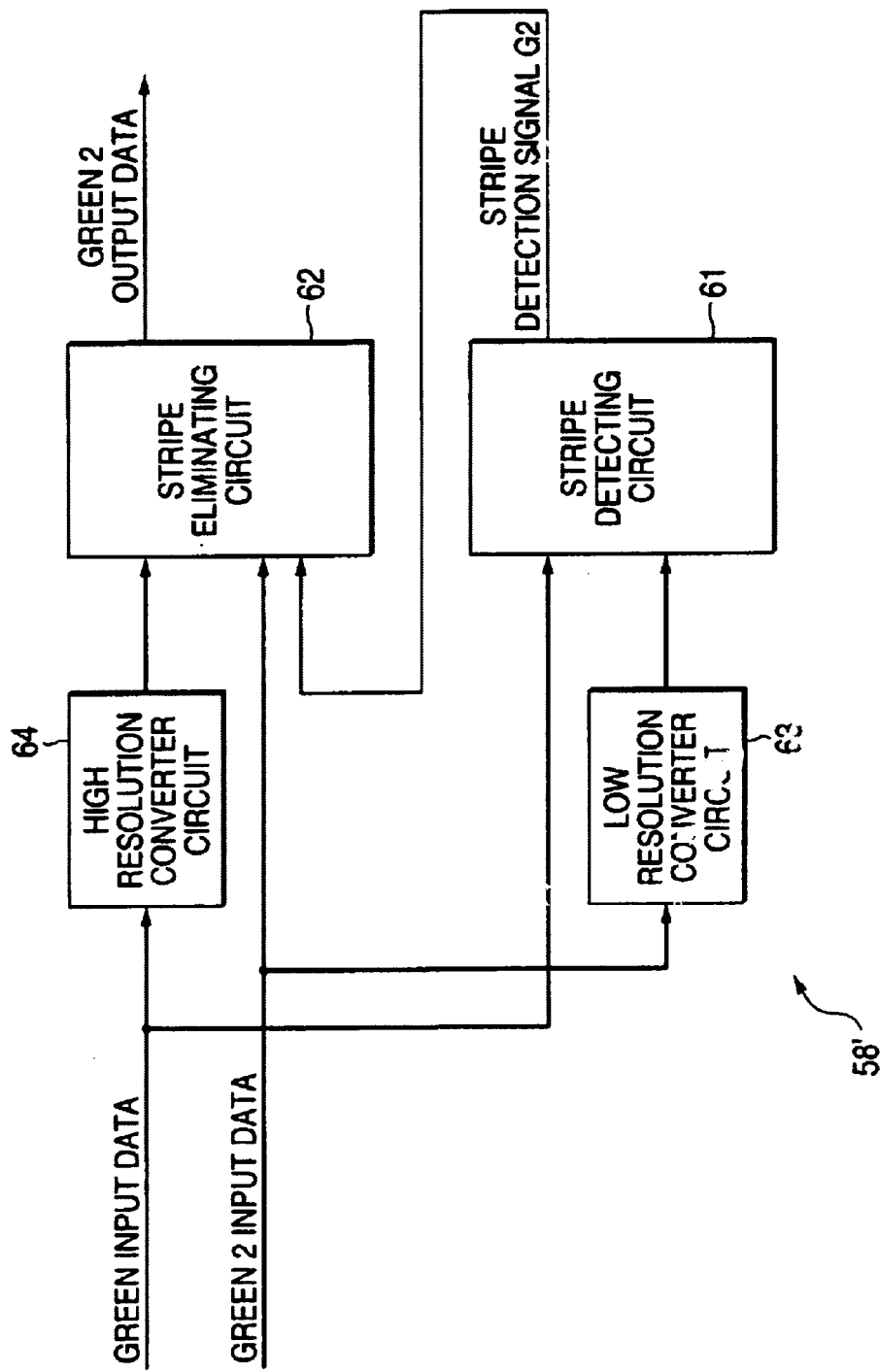
FIG. 25 is a block diagram showing another example (second construction example) of the construction of the stripe correcting circuit.

FIG. 25 is a block diagram showing the construction of the stripe correcting circuit 58' according to another example. In the figure, the same symbols are attached to the same components as in FIG. 10. As shown in FIG. 25, the stripe correcting circuit 58' according to this example includes a low resolution converter circuit 63 and a high resolution converter circuit 64 in addition to the stripe detecting circuit 61 and the stripe eliminating circuit 62.

The low resolution converter circuit 63 lowers the resolution of the read image data of the pixel row 42G (Green 2) in the sub-scanning direction to ½ and supplies the lowered data to the stripe detecting circuit 61. The high resolution converter circuit 64 increases the resolution of the read image data of the pixel row 41G (Green) in the sub-scanning direction to twice and supplies the increased data to the stripe eliminating circuit 62. The stripe detecting circuit 61 and the stripe eliminating circuit 62 have the same constructions as in the abovementioned example.

Next, an operation of the stripe detecting circuit 58' having the abovementioned construction will be described when reading of the pixel row 42G is operated at a twice speed as that of reading of the pixel rows 41R, 41G, and 41B, the resolution of reading of the pixel rows 41R, 41G, and 41B in the sub-scanning direction becomes half (½) of the resolution of reading of the pixel row 42G in the sub-scanning direction. Therefore, the read image data of the pixel row 42G is input to the stripe detecting circuit 61 together with the read image data of the pixel row 41G after lowering the resolution thereof half (½) to be equal to that of the read image data of the pixel row 41G.

Herein, the reason why the resolution of the read image data of the pixel row 41G is not increased but the resolution of the read image data of the pixel row 42G is lowered is as follows. That is, a resolution increase deteriorates the image data and lowers the stripe detecting accuracy. Therefore, data comparison is carried out upon lowering the resolution of the read image data of the pixel row 42G to be equal to that of the read image data of the pixel row 41G so that stripe detection can be carried out with accuracy. In the stripe detecting circuit 61, as described in FIG. 11, a stripe detection signal G2 is generated and output in response to action of the convex pixel detecting circuit 74, the data comparing circuit 75 and the second judging circuit 77.

Next, the read image data of the pixel row 41G is increased the resolution thereof in the sub-scanning direction twice by the high resolution converter circuit 64 to be equal to that of the read image data of the pixel row 42G. Then, the increased read image data of the pixel row 41G is input to the stripe eliminating circuit 62 together with the read image data of the pixel row 42G and the stripe detection signal G2. In the stripe eliminating circuit 62, as described in FIG. 18, the stripe elimination is carried out by replacing the read image data of the pixel row 42G with the read image data of the pixel row 41G having the increased resolution in the sub-scanning direction.

In the stripe correcting circuits according to the above-mentioned two construction examples, that is, in the stripe correcting circuit 58 according to the first construction example and the stripe correcting circuit 58' according to the second construction example, by carrying out the following switching in the image reader, which can select a mode for reading color images and a mode for reading monochrome images, correction processing in which stripes are detected and eliminated can be reliably carried out in both modes.

Figure 26:
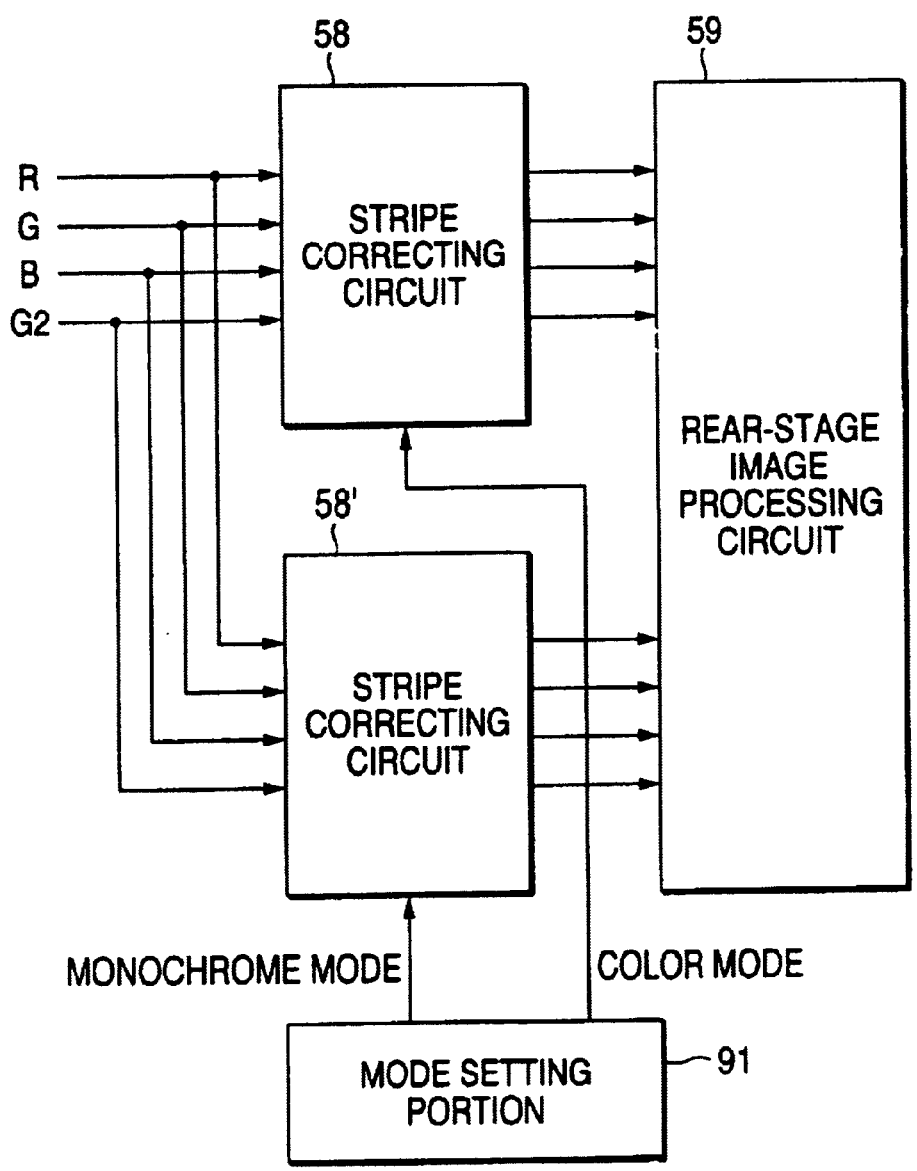
FIG. 26 is a block diagram showing another example of the construction of the main portion of the signal processing system.

Namely, as shown in FIG. 26, the stripe correcting circuit 58 according to the first construction example and the stripe correcting circuit 58' according to the second construction example are disposed in parallel to each other and either one of these is actuated depending on the operation mode (color mode/monochrome mode) set by a mode setting portion 91. In FIG. 26, for simplifying the diagram, the construction of only the main portion of the signal processing system shown in FIG. 4, that is, only the stripe correcting circuits 58 and 58' and the subsequent-stage image processing circuit 59 are shown.

In the color mode for reading color images, document images are read by setting the operation speed of reading of the pixel rows 41R, 41G, and 41B and the operation speed of reading of the pixel row 42G equal to each other and read image data of the pixel rows 41R, 41G, and 41B is output as color images, and meanwhile, stripes on read image data of the pixel rows 41R, 41G, and 41B are detected and eliminated by the stripe correcting circuit 58 relating to the first construction example.

On the other hand, in the monochrome mode for reading monochrome images, a document is read by setting the operation speed of reading of the pixel row 42G to two times that of reading of the pixel rows 41R, 41G, and 41B, and the read image data of the pixel row 42G is output as monochrome image data, and meanwhile, stripes on the read image data of the pixel row 42G are detected and eliminated by the stripe correcting circuit 58' relating to the second construction example.

As described above, according to the invention, even in a case where a color image is read by an image reader which reads an image on a sheet document while feeding the sheet document by an automatic document feeder (ADF), without increases in circuit scale, power consumption, and heat release value from photoelectric transducers, it becomes possible to accurately detect and eliminate stripes on a read image caused by adhesion of dust or the like.

What is claimed is:

1. An image reader comprising
a feeding unit for feeding a document to a reading position;
a first reading unit for reading a plurality of color components of a document image while scanning the document fed to the reading position by the feeding unit in a main scanning direction corresponding to a direction perpendicular to the feeding direction of this document;
a second reading unit disposed at a predetermined distance from the first reading unit in a sub-scanning direction corresponding to the document feeding direction, the second reading unit for reading one of the plurality of color components of the document image while scanning the document fed to the reading position by the feeding unit in the main scanning direction;
a noise detecting unit for detecting a noise component on image data read by one of the first reading unit and the second reading unit based on the plurality of pieces of image data read by the first reading unit and the second reading unit.

2. The image reader according to claim 1,
wherein the noise detecting unit includes:
a first noise detecting unit for detecting
a noise component on the image data read by the first reading unit; and
a second noise detecting unit for detecting a noise component on the image data read by the second reading unit;
wherein the noise detecting unit carries out detecting operation by the first noise detecting unit in a mode for reading color images; and
wherein the noise detecting unit carries out detecting operation by the second noise detecting unit in a mode for reading monochrome images.

3. The image reader according to claim 1,
wherein the noise detecting unit detects the noise component on image data read by the first reading unit based on:
a result of comparison between the image data read by the second reading unit and one of the image data of the plurality of color components read by the first reading unit, the one of the image data having the same color component as the image data read by the second reading unit; and
a change in the other of the image data read by the first reading unit, the other of the image data having different color components from that of the image data read by the second reading unit.

4. The image reader according to claim 1,
wherein the noise detecting unit specifies a color component on which the noise component occurs, the color component being of the plurality of color components, based on:
a result of comparison between the image data read by the second reading unit and one of the image data of the plurality of color components read by the first reading unit, the one of the image data having the same color component as the image data read by the second reading unit; and
a change in the other of the image data read by the first reading unit, the other of the image data having different color components from that of the image data read by the second reading unit.

5. The image reader according to claim 1,
wherein the noise detecting unit detects the noise component on the image data read by the second reading unit based on a result of comparison between the image data read by the second reading unit and one of the image data of the plurality of color components read by the first reading unit, the one of the image data having the same color component as the image data read by the second reading unit.

6. The image reader according to claim 1,
wherein the second reading unit reads the one of the color components of the document image, which has the widest spectral sensitivity characteristic region among the plurality of color components.

7. The image reader according to claim 1,
wherein the second reading unit reads the one of the color components of the document image, which has the highest signal output level among the plurality of color components.

8. The image reader according to claim 1,
wherein when the plurality of color components are red, green, and blue, the second reading unit reads the green component of the document image.

9. The image reader according to claim 1,
wherein the first reading unit includes a plurality of reading units, which are aligned in the sub-scanning direction, corresponding to the plurality of color components; and
wherein the second reading unit reads the one of the color components corresponding to a color component of the reading unit disposed at a center of the plurality of reading units.

10. The image reader according to claim 1, further comprising:
a noise eliminating unit for eliminating the noise component from the image data read by the one of the first reading unit and the second reading unit based on a result of the detection by the noise detecting unit.

11. The image reader according to claim 10,
wherein the noise eliminating unit replaces the image data read by the first reading unit, on which the noise component is detected by the noise detecting unit, with peripheral pixel data in which noise does not occur.

12. The image reader according to claim 10,
wherein the noise eliminating unit replaces the image data read by the second reading unit, on which the noise component is detected by the noise detecting unit, with the image data read by the first reading unit.

13. The image reader according to claim 10,
wherein the noise eliminating unit includes:
a first noise eliminating unit for replacing the image data read by the first reading unit, on which the noise component is detected by the noise detecting unit, with peripheral pixel data in which noise does not occur; and a second noise eliminating unit for replacing the image data read by the second reading unit, on which the noise component is detected by the noise detecting unit, with image data read by the first reading unit;

wherein the noise eliminating unit carries out the eliminating operation by the first noise eliminating unit in a color image reading mode; and wherein the noise eliminating unit carries out the eliminating operation by the second noise eliminating unit in a monochrome image reading mode.

14. The image reader according to claim 11, wherein the noise eliminating unit specifies the peripheral pixel data based on the image data read by the second reading unit.

15. The image reader according to claim 11, wherein the noise eliminating unit specifies the peripheral pixel data based on a positional relationship between the image data read by the second reading unit and a pixel on which the noise component is detected by the noise detecting unit.

16. The image reader according to claim 11, wherein the noise eliminating unit replaces pixel data on the image data of the color component, in which noise pixel is detected by the noise detecting unit in the image data of the plurality of color components, with the peripheral pixel data.

17. The image reader according to claim 11, wherein the noise eliminating unit selects one of:

replacement of pixel data of all color components with the peripheral pixel data; and replacement of only pixel data of the color component on which the noise component is detected by the noise detecting unit with the peripheral pixel data, based on the color component on which the noise component is detected by the noise detecting unit in the image data of the plurality of color components.

* * * * *